(12) United States Patent
Holmes

(10) Patent No.: US 10,373,156 B2
(45) Date of Patent: Aug. 6, 2019

(54) METHOD AND SYSTEM FOR LINKED ELECTRONIC WALLET APPLICATION

(71) Applicant: MasterCard International Incorporated, Purchase, NY (US)

(72) Inventor: Anthony Dewayne Holmes, Troy, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 524 days.

(21) Appl. No.: 15/156,659

(22) Filed: May 17, 2016

(65) Prior Publication Data

US 2017/0337546 A1    Nov. 23, 2017

(51) Int. Cl.
| G06Q 40/00 | (2012.01) |
| G06Q 20/36 | (2012.01) |
| G06Q 20/38 | (2012.01) |

(52) U.S. Cl.
CPC ......... *G06Q 20/36* (2013.01); *G06Q 20/3676* (2013.01); *G06Q 20/3821* (2013.01); *G06Q 40/00* (2013.01)

(58) Field of Classification Search
CPC ......... G06Q 40/00; G06Q 20/10; G06Q 20/36
See application file for complete search history.

(56) References Cited

U.S. PATENT DOCUMENTS

| 6,636,833 | B1 | 10/2003 | Flitcroft et al. |
| 7,136,835 | B1 | 11/2006 | Flitcroft et al. |
| 7,567,934 | B2 | 7/2009 | Flitcroft et al. |
| 7,571,142 | B1 | 8/2009 | Flitcroft et al. |
| 7,593,896 | B1 | 9/2009 | Flitcroft et al. |
| 8,510,220 | B2 * | 8/2013 | Rackley, III ........... G06Q 40/00 705/39 |

(Continued)

OTHER PUBLICATIONS

Terri Bradford, Where Social Networks, Payments and Banking Intersect, Dec. 2012, Federal Reserver Bank of Kansas City, web, 2-5 (Year: 2012).*

(Continued)

*Primary Examiner* — I Jung Liu
(74) *Attorney, Agent, or Firm* — Buchanan Ingersoll & Rooney PC

(57) ABSTRACT

A method for distributing credentials to a linked electronic wallet includes: storing a plurality of account profiles, each including data related to a transaction account including an associated account number, account identifier, and device identifier; storing a linked profile, the profile including data related to a linked transaction account including a primary account number, linked identifier, plurality of account identifiers, and account balance; receiving a linking request, the request including a specific account identifier and the linked identifier; identifying a specific account profile that includes the specific account identifier; updating the linked profile to include the specific account identifier in the included plurality of account identifiers; and electronically transmitting a data signal superimposed with payment credentials associated with the linked transaction account that includes at least the primary account number to a mobile communication device associated with the device identifier included in the identified specific account profile.

20 Claims, 10 Drawing Sheets

(56) References Cited

U.S. PATENT DOCUMENTS

| | | |
|---|---|---|
| 8,676,707 B2 | 3/2014 | Flitcroft et al. |
| 8,756,150 B2 | 6/2014 | Flitcroft et al. |
| 2009/0070260 A1 | 3/2009 | Flitcroft et al. |
| 2012/0072350 A1* | 3/2012 | Goldthwaite .......... G06Q 20/02 705/44 |
| 2016/0019545 A1 | 1/2016 | Vastenavondt |

OTHER PUBLICATIONS

International Search Report and Written Opinion issued by the International Search Authority dated Jun. 29, 2017 in corresponding PCT Application No. PCT/US2017/030980(13 pages).
Wikipedia: "Mobile Web", Internet Article, dated Apr. 25, 2016 (Apr. 25, 2016), XP055383798, Retrieved from the Internet: URL: https://en.wikipedia.org/w/index.php?title=Mobile_Web&oldid=717024768 [retrieved on Jun. 21, 2017] pp. 1,4-p. 5.
Zhinan, Zhou et al.: "Windows Phone 7 Programming for Android and iOS Developers 1st Edition", dated Aug. 16, 2011 (Aug. 16, 2011), Wrox, XP055383578, ISBN: 978-1-118-02197-2 pages ToC, Intr-Ch01, Ch06, p. 1-p. 13.
Damon Williams: "Pro PayPal E-Commerce", dated Mar. 8, 2007 (Mar. 8, 2007), Apress, XP055382875, ISBN: 978-1-59059-750-7 page ToC, 13, 28, Ind. pp. 13, 28.
Deborah Morley et al.: "Understanding Computers: Today and Tomorrow—Comprehensive 16th Edition", dated Feb. 16, 2016 (Feb. 16, 2016), Course Technology, XP055383375, ISBN: 978-1-305-65631-4 pages ToC, 6-15, 17-21, 23-26, 28-32, 138-139, 143-147, 150-154, 157-161, 194-195, 243, 285-286, 318, 320, 326-326, p. 6-p. 7, pp. 10, p. 20-p. 21, p. 24-p. 25, p. 138-p. 146, p. 323-p. 325, p. 501-pp. 502, 511.

\* cited by examiner

METHOD AND SYSTEM FOR LINKED ELECTRONIC WALLET APPLICATION

FIELD

The present disclosure relates to the distribution of credentials to a linked electronic wallet, specifically the linking of multiple electronic wallets to a single transaction account such that electronic transactions involving the linked account are funded by each of the linked electronic wallets.

BACKGROUND

As long as there have been payment transactions, consumers have engaged in shared transactions. With traditional paper currency, each of the participating consumers would pitch in with their portion, with the accumulated paper currency being presented to the merchant and any change distributed accordingly. As payment cards, such as credit and debit cards, have increased in use, many merchants have begun to accommodate the sharing of transactions by using point of sale systems configured to split transaction amounts and charge the split transaction amount to each of the various payment cards supplied by the consumers.

However, such methods only enable the sharing of a transaction among consumers who are physically together. In instances where a single consumer is shopping on behalf of others, the sharing of a transaction becomes more difficult. The shopping consumer may conduct the payment transaction, but then must rely on the other consumers to pay them back. Not only may this be unreliable, but it also requires the shopping consumer to have access to the full transaction amount and later be refunded, which may be difficult, particularly for larger purchases and instances where the shopping consumer uses a debit card.

Thus, there is a need for a technical solution whereby a transaction can be charged to a group of consumers, but without the need for each of the consumers to be present or provide separate payment details. The use of a technical solution that can enable a transaction to be shared among multiple consumers by the presentation of a single set of payment details may also enable the sharing of a transaction without modification to merchant point of sale systems, resulting in easier adoption and use of such a solution.

SUMMARY

The present disclosure provides a description of systems and methods for distributing credentials to a linked electronic wallet.

A method for distributing credentials to a linked electronic wallet includes: storing, in an account database of a processing server, a plurality of account profiles, wherein each account profile includes a structured data set configured to store data related to a transaction account including at least an associated account number, an account identifier, and a device identifier; storing, in a linked database of the processing server, a linked profile, wherein the linked profile includes a structure data set configured to store data related to a linked transaction account including at least a primary account number, a linked identifier, a plurality of account identifiers, and an account balance; receiving, by a receiving device of the processing server, a data signal superimposed with a linking request, wherein the linking request includes at least a specific account identifier and the linked identifier; executing, by a querying module of the processing server, a query on the account database to identify a specific account profile where the included account identifier corresponds to the specific account identifier; updating, by an updating module of the processing server, the linked profile to include the specific account identifier in the included plurality of account identifiers; and electronically transmitting, by a transmitting device of the processing server, a data signal superimposed with payment credentials associated with the linked transaction account that includes at least the primary account number to a mobile communication device associated with the device identifier included in the identified specific account profile.

A system for distributing credentials to a linked electronic wallet includes: an account database of a processing server configured to store a plurality of account profiles, wherein each account profile includes a structured data set configured to store data related to a transaction account including at least an associated account number, an account identifier, and a device identifier; a linked database of the processing server configured to store a linked profile, wherein the linked profile includes a structure data set configured to store data related to a linked transaction account including at least a primary account number, a linked identifier, a plurality of account identifiers, and an account balance; a receiving device of the processing server configured to receive a data signal superimposed with a linking request, wherein the linking request includes at least a specific account identifier and the linked identifier; a querying module of the processing server configured to execute a query on the account database to identify a specific account profile where the included account identifier corresponds to the specific account identifier; an updating module of the processing server configured to update the linked profile to include the specific account identifier in the included plurality of account identifiers; and a transmitting device of the processing server configured to electronically transmit a data signal superimposed with payment credentials associated with the linked transaction account that includes at least the primary account number to a mobile communication device associated with the device identifier included in the identified specific account profile.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
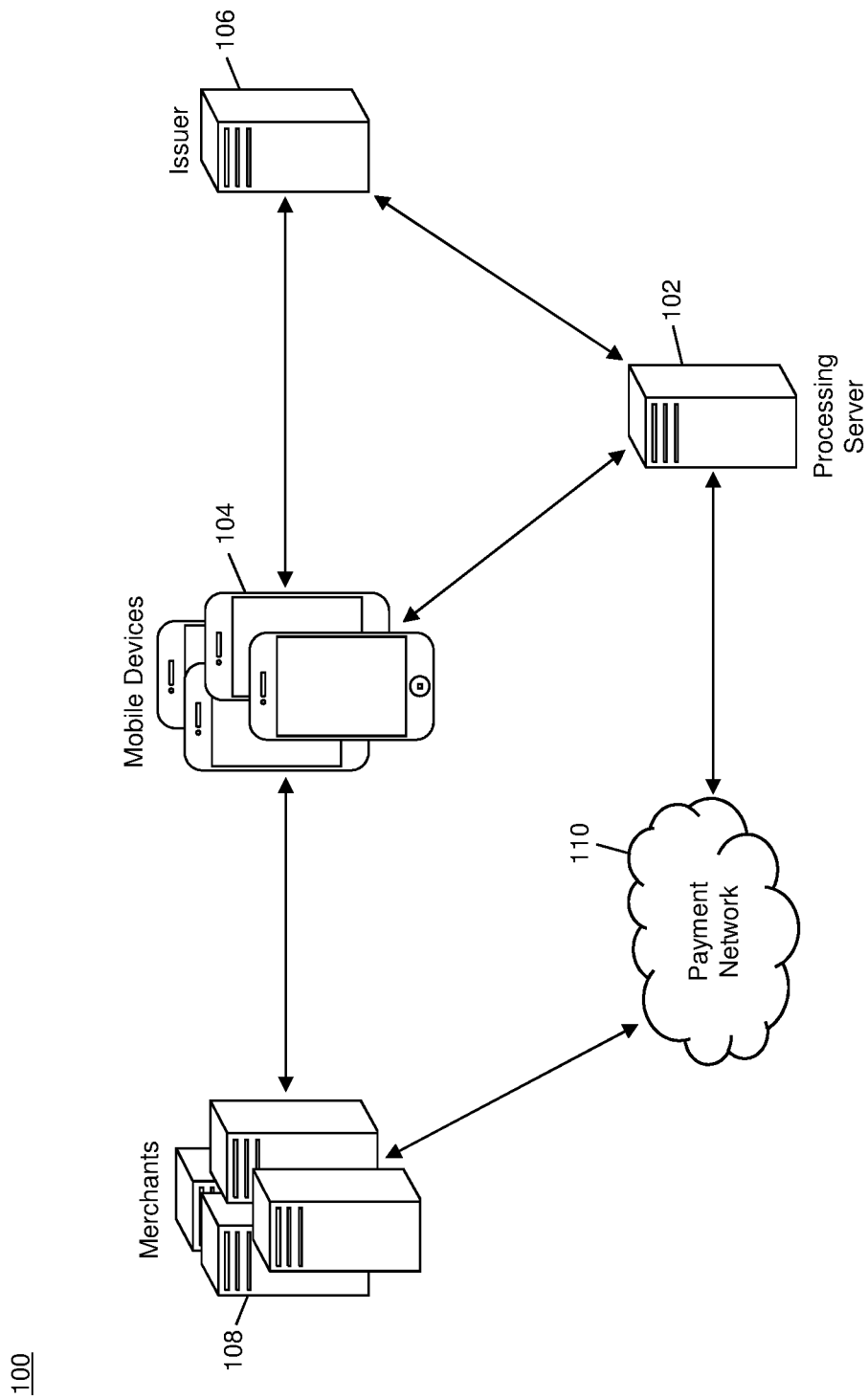
FIG. 1 is a block diagram illustrating a high level system architecture for distributing payment credentials to a linked electronic wallet for use in shared payment transactions in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Payment Card—A card or data associated with a transaction account that may be provided to a merchant in order to fund a financial transaction via the associated transaction account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated transaction account (e.g., as stored in a communication device, such as a smart phone or computer). For example, in some instances, data including a payment account number may be considered a payment card for the processing of a transaction funded by the associated transaction account. In some instances, a check may be considered a payment card where applicable.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Controlled Payment Number—Controlled payment numbers may be payment numbers associated with a payment account that are subject to one or more rules. In many cases, these rules may be set by a cardholder, such as spending limits, limits on days and/or times of a transaction, limits on merchants or industries, transaction spending or frequency limits, etc. Controlled payment numbers may offer an account holder an opportunity to give payment cards tied to the account to others for use, but subject to rules set by the cardholder, such as an employer distributing cards to employees, or a parent distributing cards to children. Additional detail regarding controlled payment numbers may be found in U.S. Pat. No. 6,636,833, issued Oct. 21, 2003; U.S. Pat. No. 7,136,835, issued Nov. 14, 2006; U.S. Pat. No. 7,571,142, issued Aug. 4, 2009; U.S. Pat. No. 7,567,934, issued Jul. 28, 2009; U.S. Pat. No. 7,593,896, issued Sep. 22, 2009; U.S. patent application Ser. No. 12/219,952, filed Jul. 30, 2008; U.S. patent application Ser. No. 12/268,063, filed Nov. 10, 2008; and U.S. patent application Ser. No. 12/359,971, filed Jan. 26, 2009; each of which are herein incorporated by reference in their entirety.

System for Shared Transactions Via Linked Electronic Wallets

FIG. 1 illustrates a system 100 for the distribution of payment credentials to linked electronic wallets for use in shared payment transactions.

The system 100 may include a processing server 102. The processing server 102, discussed in more detail below, may be configured to provision payment credentials to mobile devices 104 for use in a shared electronic wallet and may be further configured to perform the processing of transactions associated thereto in the processing of a shared payment transaction. A general purpose computer would not be capable of carrying out these functions without being specifically configured to do so, usually through executing code that configures the logic circuit of the computers processor and ancillary devices to perform operations that collectively perform the functions disclosed herein. Each mobile device 104 may a suitable type of mobile computing device specifically configured to perform the functions discussed herein, such as a cellular phone, smart phone, tablet computer, laptop computer, notebook computer, smart watch, wearable computing device, implantable computing device, etc. A general purpose mobile device would not be capable of carrying out these functions without being specifically configured to do so, usually through executing code, as discussed above. Each mobile device 104 may be configured to execute an electronic wallet application program, which may be an application program configured to serve as an electronic wallet for the management of payment credentials and use and conveyance thereof in the conducting of payment transactions.

Each mobile device 104 may be associated with one or more issuers 106, which may be a financial institution, such as an issuing bank, or other entity configured to possess or otherwise manage a transaction account used in the funding of payment transactions. Each mobile device 104 of the plurality of mobile devices 104 may register with the processing server 102 to be linked to the other mobile devices 104 via a linked electronic wallet. Registration may include the electronic transmission of a data signal to the processing server 102 via a suitable communication network that is superimposed with a registration request. The registration request may indicate one or more of the other mobile devices 104 with which the registering mobile device 104 wants to be linked, or may indicate a shared transaction account with which the registering mobile device 104 wants to be linked. The indication of one or more of the other mobile devices 104 may be a device identifier or other identification value associated with the respective mobile device 104 or its respective electronic wallet, such as a media access control address, registration number, serial number, phone number, e-mail address, username, etc. The communication network may be any type of communication network suitable for executing protocols exchanging data signals between the mobile devices 104 and the processing server 102, such as a cellular communication network, the Internet, a local area network, a radio frequency network, etc. The registration request may also include information identifying the registering mobile device 104, such as a device identifier or other identifying information associated with the mobile device 104 or its electronic wallet. As used herein, "device identifier" may refer to any identification value associated with a mobile device 104 or an electronic wallet of the respective mobile device 104.

The processing server 102 may register an account profile for each of the individual mobile devices 104, as well as a shared or linked profile that indicates the linking of each of the plurality of mobile devices 104. The individual account profiles may include the device identifier for the respective mobile device 104, as well as information associated with one or more transaction accounts tied to the associated electronic wallet. The transaction account information may include at least an account identifier and a transaction account number. The account identifier may be a value used in the identification of the associated transaction account, which may be different from the transaction account number. The account identifier may be a numerical value or other type of identification value (e.g., alphanumeric) and may be random, pseudorandom, or assigned to the transaction account directly by the processing server 102 or a user associated with the corresponding mobile device 104. The transaction account number may be the account number for the associated transaction account, which may be used in the processing of payment transactions involving the associated transaction account. Methods for registering a transaction account with the processing server 102 may include the providing of transaction account data (e.g., authentication information) to the processing server 102 and validation and authentication thereof by an associated issuer 106, for instance, and other methods that will be apparent to persons having skill in the relevant art.

A linked profile may be associated with a plurality of account profiles that have been linked together via the registration process involving each of the associated mobile devices 104. The linked profile may include at least an account identifier for each of the linked mobile devices 104, which may be one of the account identifiers included in an account profile associated with the respective mobile device 104. In instances where a mobile device 104 may be registered with multiple transaction accounts, the mobile device 104 may indicate a specific transaction account (e.g., using the account identifier) that is to be linked to the linked profile. In some embodiments, the transaction accounts associated with the linked profile may be associated with one or more different issuers 106, and may include different types of transaction accounts (e.g., debit accounts, credit card accounts, savings accounts, etc.).

The processing server 102 may be configured to associate a linked profile with a unique, linked transaction account. The linked transaction account may be a transaction account that is associated with the linked profile that may be usable by each of the mobile devices 104 linked to the linked profile (e.g., via their respective electronic wallets). In some instances, the linked transaction account may be a traditional transaction account associated with an issuer 106 where payment transactions involving the transaction account may be processed using traditional methods and systems. In other instances, the linked transaction account may be comprised of a transaction account number that is a valid transaction account number with respect to use in a payment transaction at a merchant 108 or payment network 110, but may be routed to the processing server 102 for processing at the issuing financial institution. In such instances, the processing server 102 may be the issuer of the linked transaction account, and may perform processing as discussed herein, which may vary from traditional issuer processing of payment transactions. The linked transaction account may be a virtual card number (VCN)(whether in electronic form or on plastic magnetic stripe or chip enabled card) that is not associated directly to a line of credit, but rather linked to transaction accounts that are.

The processing server 102 may store a linked account identifier associated with the linked transaction account as well as the transaction account number, also referred to herein as a "primary account number" when used in a payment transaction, in the linked profile. The processing server 102 may provision payment credentials to each of the linked mobile devices 104 for the linked transaction account. The payment credentials may include at least the linked account identifier and transaction account number, as well as other account data used in the processing of payment transactions at a merchant 108, such as a name, expiration date, security code, transaction counter, etc. The payment credentials may be provisioned to the mobile devices 104 via a suitable communication network using methods and systems that will be apparent to persons having skill in the relevant art.

A user of one of the mobile devices 104 may then conduct a payment transaction at a merchant 108. As part of the conducting of the payment transaction, the mobile device 104 may convey the payment credentials for the linked transaction account to the merchant 108 for use in the funding of the payment transaction. Methods for the conveyance of payment credentials may include the electronic transmission of the payment credentials via near field communication, the display of a machine-readable code encoded with the payment credentials that is read by a point of sale device of the merchant 108, or other suitable method as will be apparent to persons having skill in the relevant art. The merchant 108 may receive the payment credentials, and may electronically transmit the payment credentials and other transaction data (e.g., transaction amount, transaction time, transaction date, geographic location, offer data, reward data, loyalty data, product data, etc.) to an acquiring financial institution, gateway processor, or other entity for forwarding on to a payment network 110 for processing.

The payment network 110 may receive a transaction message for the payment transaction via the payment rails (described below with reference to FIG. 9). The transaction message may originate from an acquiring financial institution or other entity and may be a specially formatted data message that is formatted pursuant to one or more standards governing the exchange of financial transaction messages, such as the International Organization of Standardization's ISO 8583 standard. The transaction message may include a plurality of data elements, where each data element is configured to store data as set forth in the associated standard(s). For example, each transaction message may include a data element configured to store a primary account number, a data element configured to store a transaction amount, etc. Transaction messages may also include a message type indicator, which may be indicative of a type for the transaction message, such as an authorization request, authorization response, etc. The payment network 110 may receive the transaction message and may perform standard processing for the payment transaction as will be apparent to persons having skill in the relevant art.

As part of the processing, the transaction message or data stored therein may be routed to the processing server 102 based on identification of a linked transaction account number being stored in the data element configured to store the primary account number. The transaction message or data may be electronically transmitted via the payment rails or an alternative suitable communication network. The processing server 102 may identify the linked profile that corresponds to the linked transaction account number used in the payment transaction. The processing server 102 may then identify if the linked transaction account has access to sufficient funds for the payment transaction.

In some embodiments, the linked transaction account may be a pre-funded transaction account, such as a prepaid transaction account. In such an embodiment, the linked profile may include an account balance for the linked transaction account. The processing server 102 may determine if there is a sufficient balance for the linked transaction account to cover the transaction amount for the payment transaction. If there is a sufficient balance, then the processing server 102 may indicate approval of the transaction to the payment network 110, such as by generating and submitting an authorization response to the payment network 110 via the payment rails that includes a response code indicating approval of the payment transaction. If the balance is insufficient, the authorization response may include a response code indicating that the payment transaction is declined.

In other embodiments, the linked transaction account may not be pre-funded. In such an embodiment, the processing server 102 may determine if the linked transaction account has access to sufficient funds to cover the transaction amount. Such a determination may be based on, for example, a credit limit associated with the linked transaction account, a credit limit or available balance for the transaction accounts that are linked to the linked transaction account, a previously established amount that may be identified during registration of the account, etc. The processing server 102 may generate an authorization response indicating approval or denial of the payment transaction based on the sufficiency of funds for the linked transaction account to cover the transaction amount for the payment transaction.

In some embodiments, the processing server 102 may also perform additional processing for the payment transaction as part of the approval/denial process. For example, the processing server 102 may evaluate the transaction message or data for a likelihood of fraud or perform other additional services that may be performed with respect to a payment transaction as will be apparent to persons having skill in the relevant art. In such instances, approval or denial of the payment transaction may also be based on such additional services.

The linked transaction account may be funded by the associated transaction accounts registered by the users of the linked mobile devices 104. For linked transaction accounts that are pre-funded, the balance of the linked transaction account may be funded via payments from the associated transaction accounts to the processing server 102 to increase the funded balance. For linked transaction accounts that are not pre-funded, payment transactions using the linked transaction account may be charged to the associated transaction accounts. In some instances, each associated transaction account (herein referred to as "funding accounts") may pay an equal amount for transactions conducted using the linked transaction account or for the funding thereof. For example, if six mobile device 104 users register for a linked transaction account, each of their respective funding transaction accounts may pay for one-sixth of each transaction conducted using the linked transaction account. In other instances, the contribution rates for funding transaction accounts may be based on one or more rules. For example, three users may be linked with a transaction account where a first user contributes to half of the linked account, while the other two users each contribute to a quarter of the linked account.

The processing of a payment transaction that is funded via the linked transaction account that is not pre-funded may include the processing of funding payment transactions from each of the funding accounts during the processing of the payment transaction funded via the linked transaction account. For instance, a mobile device 104 may be used in a transaction with a merchant 108 that is to be funded using the linked transaction account. The merchant 108 may submit (e.g., via one or more intermediate entities) a transaction message for the payment transaction to the payment network 110, which may include the payment details for the linked transaction account for funding. The transaction message may be routed to the processing server 102, which may then identify the funding transaction accounts associated with the linked transaction account to be used in funding. The processing server 102 may then initiate a plurality of secondary payment transactions for the funding of the initial payment transaction, based on funding rules associated with the linked transaction account. For example, if there are four funding transaction accounts that each contribute 25% to the linked transaction account, the processing server 102 may initiate four different secondary payment transactions for 25% of the transaction amount of the primary payment transaction, with each secondary payment transaction being funded by a different funding transaction account. The use of secondary payment transactions as funding for a primary payment transaction may be referred to herein as multiple cascading authorization, wherein the primary payment transaction may also be referred to as a split payment transaction.

Once the processing server 102 received authorization for each of the four secondary payment transactions, using traditional methods and systems for transaction processing (e.g., which may involve the payment network 110 and issuers 106 for the funding transaction accounts), the processing server 102 may proceed with processing the primary payment transaction accordingly. For instance, if each of the secondary payment transactions is approved, then the processing server 102 may approve the primary payment transaction, such as by returning an authorization response to the payment network 110 that includes a data element configured to store a response code indicating approval of the transaction. If one or more of the secondary payment transactions is declined, then the processing server 102 may decline the payment transaction by returning an authorization response to the payment network where the data element configured to store a response code includes a code indicating that the transaction is declined. In the latter instance, the processing server 102 may initiate a chargeback, reversal, or other similar process for the secondary payment transactions that were approved, such that the funding transaction accounts are not debited for the incomplete primary payment transaction.

In some instances, the linked transaction account may be subject to transaction controls. Transaction controls may be set for the linked transaction account such that payment transactions conducted using the transaction account must comply with the transaction controls. Transaction controls may include, for instance, controls on transaction amounts, merchants, geographic locations, products, merchant categories or industries, transaction times, transaction dates, other transaction data, or a combination thereof. In some cases, transaction controls may also be established for one or more periods of time. For example, transaction controls may be established to place a limit on the transaction amount for a single transaction, as well as an aggregated amount spent over a set period of time, such as per month. Transaction controls may also be combined, such as a control establishing that a specific merchant can only be transacted with during business hours on a weekday, a control limiting transactions to restaurants in a specific geographic area, etc. In some embodiments, transaction controls may be established and approved by one or more of the individuals associated with the funding transaction accounts, such as using the mobile devices 104. For example, each mobile device 104 registered with the linked transaction account may pre-approve a future payment transaction, for which transaction controls may be established.

In some cases, funding rules may utilize criteria used in the creation of transaction controls. For instance, a rule may be established for the contribution rates of the transaction accounts associated with a linked transaction account based on transaction data. For example, four funding transaction accounts may each contribute equally (e.g., 25% each) to payment transactions in general, but may have a 40/20/20/20 split for clothing purchases, a 50/30/10/10 split for restaurants, an 70/10/10/10 split for a specific sporting goods store, etc. In such instances, funding rules may be used to provide for desire levels of contribution to purchases as may be agreed upon by the users of the linked transaction account. For example, extended family may want to assist an undergraduate student with their purchases when they are away at school. A linked transaction account may be established where the student contributes 100% to transactions by default, where the contribution rate is 30% by the student, 30% by the parents, and 10% by each of four different extended family members for school-related purchases (e.g., the student bookstore, merchants on campus, etc.), and where the contribution rate is 20% by the student and 80% by an uncle for purchases at the athletic ticket office to attend school sporting events.

In some embodiments, transaction controls and funding rules may be set by any user associated with the linked transaction account. In other embodiments, rules may be established regarding the setting of transaction controls or funding rules, such as requiring majority approval of rules, confirmation from any funding transaction account holder for a funding rule involving the respective funding transaction account, allowing only a primary user of the linked transaction account to set transaction controls or funding rules, etc. In such cases, the rules may be set when the linked transaction account is established or may be set at a later date. In some instances, mobile devices 104 may be required to provide consent to such rules before receiving payment credentials for the linked transaction account.

In some embodiments, the transaction account number for the linked transaction account may be a controlled payment number. The controlled payment number may be subject to the one or more transaction controls set for the linked transaction account. In some instances, a controlled payment number identified for a linked transaction account may have an expiration associated therewith. The expiration may be one or more criteria that, once met, may render the controlled payment number unusable. For example, the expiration may be a date, number of transactions, aggregate transaction amount, or other criteria. Once the controlled payment number has expired, the processing server 102 may generate a new controlled payment number to be used with the linked transaction account that is distributed to the mobile devices 104. In such an instance, the expiration of controlled payment numbers may provide for additional security as to the usage of the linked transaction account. For example, a controlled payment number may expire after every $500 charged to the linked transaction account, such that if a mobile device 104 having access to the linked transaction account is compromised, the exposure of the associated funding transaction accounts to nefarious charges may be limited. In such embodiments, the criteria for expiration of the controlled payment number may be set by one or more of the mobile devices 104, such as with transaction controls and funding rules. In another example, a controlled payment number may expire upon criteria set by the mobile devices 104, without a new controlled payment number being generated until new criteria is provided. For instance, four mobile devices 104 associated with a linked transaction account may pre-approve a controlled payment number with a limit of $100 for purchasing a birthday present that is set to expire after a single transaction, such that the linked transaction account may be used for the one purchase of up to $100 and not used again until the individuals pre-approve future transactions.

In some embodiments, one or more of the mobile devices 104 may be notified when the linked transaction account is used. For example, if a first mobile device 104 initiates a payment transaction using the linked transaction account, one of more of the other mobile devices 104 associated with the linked transaction account may be notified of the transaction. In such an instance, the individuals associated with the linked transaction account may be able to monitor usage of the linked transaction account. For example, parents that are assisting in funding a linked transaction account to be used by a child away at school may monitor to ensure the child is using the linked transaction account as instructed. In some instances, mobile devices 104 may receive notifications only if transactions are attempted using the linked transaction account that violate one or more transaction controls.

Methods and systems discussed herein may enable multiple mobile devices 104 to each be associated with a single transaction account that can be used in payment transactions where the funding of the transactions may be split across transaction accounts for each electronic wallet, without the other electronic wallets having to be present or provide consent at the time of the transaction. As a result, the methods and systems discussed herein may provide for more efficient and effective shared transactions. In addition, the use of a single transaction account for processing of the shared transactions that uses traditional transaction messaging from the merchant 108 to the payment network 110 can result in use of the methods discussed herein without the need for modifying legacy point of sale systems and merchant and acquiring financial institution infrastructure.

Processing Server

Figure 2:
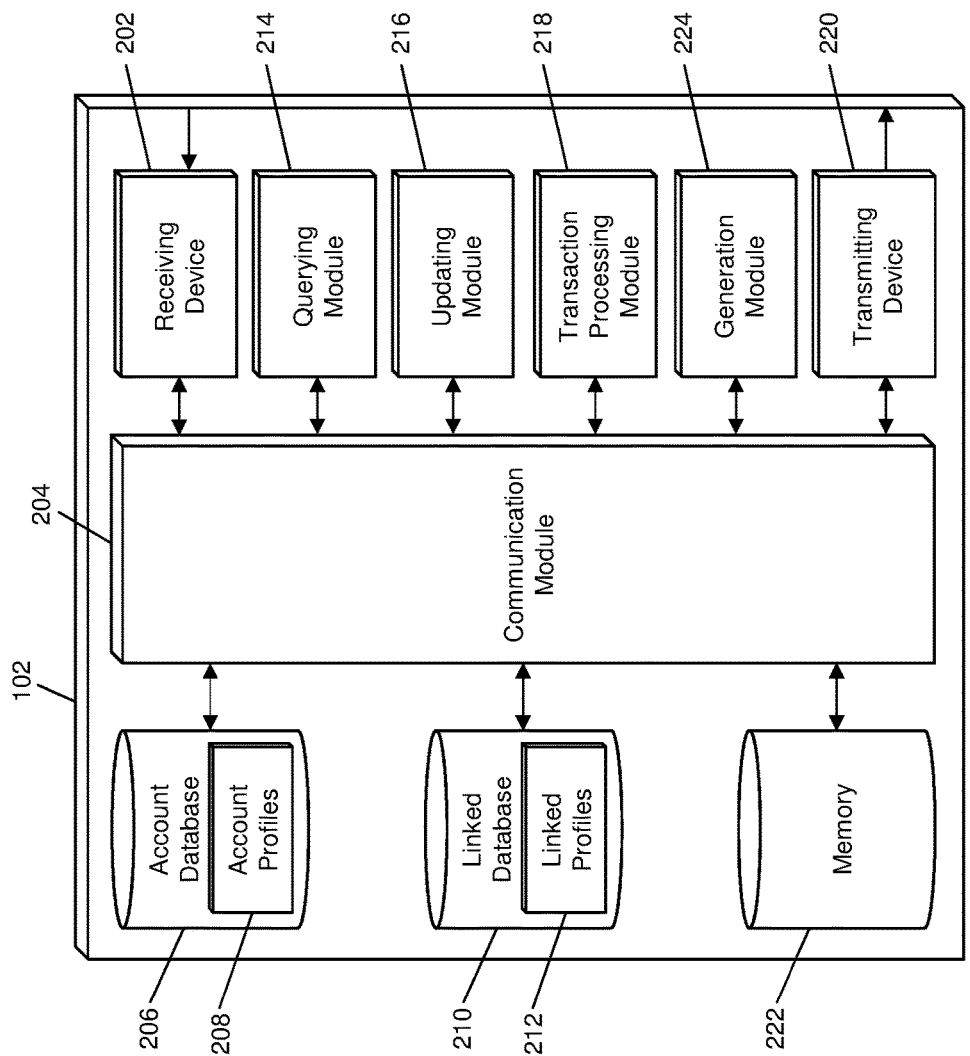
FIG. 2 is a block diagram illustrating the processing server of FIG. 1 for the provisioning and processing of payment credentials in a linked electronic wallet in accordance with exemplary embodiments.

FIG. 2 illustrates an embodiment of the processing server 102 of the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 800 illustrated in FIG. 8 and discussed in more detail below may be a suitable configuration of the processing server 102.

The processing server 102 may include a receiving device 202. The receiving device 202 may be configured to receive data over one or more networks via one or more network protocols. In some embodiments, the receiving device 202 may be configured to receive data over the payment rails, such as using specially configured infrastructure associated with payment networks 110 for the transmission of transaction messages that include sensitive financial data and information. In some instances, the receiving device 202 may also be configured to receive data from mobile devices 104, issuers 106, payment networks 110, and other entities via alternative networks, such as the Internet. In some embodiments, the receiving device 202 may be comprised of multiple devices, such as different receiving devices for receiving data over different networks, such as a first receiving device for receiving data over payment rails and a second receiving device for receiving data over the Internet. The receiving device 202 may receive electronically data signals that are transmitted, where data may be superimposed on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by mobile devices 104, which may be superimposed with registration requests and other data requests. Registration requests may include registration information for the opening of a linked transaction account, which may include a device identifier associated with the mobile device 104 and an account identifier and/or transaction account number associated with a transaction account used to fund the linked transaction account. In instances where the linked transaction account has already been created, such as where a mobile device 104 is joining the linked transaction account, the registration request may also include a linked identifier corresponding to the linked transaction account. In some instances, the receiving device 202 may receive credential requests from mobile devices 104 separate from registration requests, which may include a linked identifier and request payment credentials associated with the corresponding linked transaction account. The receiving device 202 may also receive data signals from mobile devices 104 superimposed with funding rule or transaction control requests, controlled payment number requests or criteria requests, or other data messages suitable for use in the management of a linked transaction account.

The receiving device 202 may also be configured to receive transaction data from payment networks 110. The transaction data may be received via the payment rails or a suitable, alternative communication network. In some embodiments, the transaction data may be included in a transaction message formatted based on one or more standards, such as the ISO 8583 standard. The transaction message may include a plurality of data elements including at least a first data element configured to store a primary account number, which may include a linked transaction account number, and one or more data elements configured to store additional transaction data, such as a transaction amount, transaction time, transaction date, geographic location, merchant data, product data, offer data, reward data, loyalty data, etc.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, updating module 216, transaction processing module 218, etc. As used herein, the term "module" may be software or hardware particularly programmed to receive an input, perform one or more processes using the input, and provide an output. The input, output, and processes performed by various modules will be apparent to one skilled in the art based upon the present disclosure.

The processing server 102 may include an account database 206. The account database 206 may be configured to store a plurality of account profiles 208 using a suitable data storage format and schema. The account database 206 may be a relational database that utilizes structured query language for the storage, identification, modifying, updating, accessing, etc. of structured data sets stored therein. Each account profile 208 may be a structured data set configured to store data associated with a transaction account that is linked to one or more other transaction accounts using the methods and systems discussed herein. Each account profile 208 may include at least an account identifier, transaction account number, and device identifier associated with the related transaction account. The account identifier may be a unique value associated with the transaction account, such as the transaction account number, a username, e-mail address, registration number, identification number, etc. The device identifier may be a unique value associated with one or more mobile devices 104 authorized for use with the transaction account. In some instances, the account identifier and device identifier may be the same value.

The processing server 102 may also include a linked database 210. The linked database 210 may be configured to store a plurality of linked profiles 212 using a suitable data storage format and schema. The linked database 210 may be a relational database that utilizes structured query language for the storage, identification, modifying, updating, accessing, etc. of structured data sets stored therein. Each linked profile 212 may be a structured data set configured to store data related to a linked transaction account. Each linked profile 212 may include at least a transaction account number and account identifier associated with the related linked transaction account, and may also include a plurality of account identifiers, where each is included in an account profile 208 related to a transaction account that is associated with the linked transaction account as being a funding transaction account. In some instances, a linked profile 212 may also include an account balance, one or more funding rules, one or more controlled payment number criteria, and/or one or more transaction controls, depending on the type and usage of the linked transaction account. For instance, a pre-funded linked transaction account may have an account balance, whereas a credit-based linked transaction account may not have an associated balance, but may instead, in some instances, have a credit limit included therein.

The processing server 102 may include a querying module 214. The querying module 214 may be configured to execute queries on databases to identify information. The querying module 214 may receive one or more data values or query strings, and may execute a query string based thereon on an indicated database, such as the account database 206 and linked database 210, to identify information stored therein. The querying module 214 may then output the identified information to an appropriate engine or module of the processing server 102 as necessary. The querying module 214 may, for example, execute a query on the linked database 210 to identify a linked profile 212 based on an account identifier or linked identifier, such as for identification of a linked profile 212 for use in determining approval or denial of a payment transaction. The querying module 214 may output the identified linked profile 212 to the transaction processing module 218 for processing.

The updating module 216 may be configured to update data stored in the processing server 102, such as the data stored in the account database 206 and linked database 210. The updating module 216 may receive data to be used in updating the data stored in the processing server 102, may perform the necessary actions to update the data accordingly, and may output a result of the updating (e.g., success or failure). For example, the updating module 216 may receive data included in a registration request received by the receiving device 202 for registering a new funding transaction account to a linked transaction account. The updating module 216 may generate a query to be executed by the querying module 214 on the linked database 210 to update the linked profile 212 associated with the linked transaction account indicated in the request (e.g., based on the included linked identifier) by adding the account identifier corresponding to the funding transaction account into the linked profile 212, and adjusting any funding rules included therein accordingly. In another example, the updating module 216 may be configured to generate queries for execution by the querying module 214 for updating funding rules or transaction controls based on data received by the receiving device 202.

The transaction processing module 218 may be configured to perform the functions of the processing server 102 in association with the processing of payment transactions. The transaction processing module 218 may receive transaction data for a payment transaction received by the receiving device 202 and a linked profile 212 identified by the querying module 214 as associated with the payment transaction (e.g., using a linked identifier stored in a data element in the transaction data configured to store a primary account number). The transaction processing module 218 may determine approval or denial of the payment transaction based on transaction controls, account balances and/or credit limits, fraud rules, and other considerations based on the transaction data. The transaction processing module 218 may be configured to generate a transaction message indicated as an authorization response, which may indicate the approval or denial of the transaction. In some instances, the transaction processing module 218 may modify a received transaction message to be an authorization response, such as by modifying the message type indicator and including the indication of approval or denial in a data element configured to store a response code.

The transaction processing module 218 may also be configured to generate transaction messages for additional payment transactions, such as for payment transactions used in the funding of the linked transaction account for the payment transaction. For example, in instances where a linked transaction account is not pre-funded, once a payment transaction involving the linked transaction account is approved, the transaction processing module 218 may generate transaction messages for payment transactions for the funding of the transaction amount by the various funding transaction accounts based on funding rules associated with the linked transaction account. In some cases, the transaction processing module 218 may generate transaction messages for payment transactions for funding of the transaction amount by the various funding transactions during the processing of a primary payment transaction using the linked transaction account. In such an instance, the transaction processing module 218 may determine approval or denial of the primary payment transaction based on authorization responses for the secondary payment transactions received by the receiving device 202, and may generate an authorization response accordingly. In instances where a linked transaction account is pre-funded, the transaction processing module 218 may update (e.g., via an instruction to the updating module 216) the account balance of the linked profile 212 and may also initiate payment transactions for further funding of the linked transaction account, such as based on funding rules. For example, the users associated with a linked transaction account may set rules for a minimum balance of the linked transaction account such that, when the account balance falls below the minimum, the transaction processing module 218 may automatically initiate transactions to further fund the account. The transaction processing module 218 may also be configured to make adjustments to credit limits, balances, etc. of linked transaction accounts based on the processing of payment transactions, such as by instructing the querying module 214 and/or updating module 216 to modify linked profiles 212 and/or account profiles 208 stored in the linked database 210 or account database 206, respectively, accordingly.

In some embodiments, the processing server 102 may also include a generation module 224. The generation module 224 may be configured to generate or otherwise identify a controlled payment number for use in funding payment transactions using a linked transaction account. The controlled payment number may be subject to one or more transaction controls and may also be associated with one or more expiration criteria, such that the controlled payment number may no longer be usable (e.g., may be inactive) to fund a payment transaction once expired. The generation module 224 may be configured to output a generated controlled payment number to another module or engine of the processing server 102, such as to the querying module 214 for inserting into a linked profile 212 for use in conjunction with the related linked transaction account.

The processing server 102 may also include a transmitting device 222. The transmitting device 222 may be configured to transmit data over one or more networks via one or more network protocols. In some embodiments, the transmitting device 222 may be configured to transmit data over the payment rails, such as using specially configured infrastructure associated with payment networks 110 for the transmission of transaction messages that include sensitive financial data and information, such as identified payment credentials. In some instances, the transmitting device 222 may be configured to transmit data to mobile devices 104, issuers 106, payment networks 110, and other entities via alternative networks, such as the Internet. In some embodiments, the transmitting device 222 may be comprised of multiple devices, such as different transmitting devices for transmitting data over different networks, such as a first transmitting device for transmitting data over the payment rails and a second transmitting device for transmitting data over the Internet. The transmitting device 222 may electronically transmit data signals that have data superimposed that may be parsed by a receiving computing device. In some instances, the transmitting device 222 may include one or more modules for superimposing, encoding, or otherwise formatting data into data signals suitable for transmission.

The transmitting device 222 may be configured to electronically transmit data signals to mobile devices 104 via suitable communication networks that are superimposed with data messages associated with the use and management of a linked transaction account, such as confirmation messages, notifications, account data, etc. The transmitting device 222 may also be configured to transmit data signals to mobile devices 104 superimposed with payment credentials, for the provisioning of payment credentials for a linked transaction account to the mobile device 104. The transmitting device 222 may also be configured to electronically transmit transaction messages to payment networks 110 and issuers 106 via the payment rails or a suitable, alternative communication network for payment transactions, which may include authorization requests and authorization responses.

The processing server 102 may also include a memory 222. The memory 222 may be configured to store data for use by the processing server 102 in performing the functions discussed herein. The memory 222 may be configured to store data using suitable data formatting methods and schema and may be any suitable type of memory, such as read-only memory, random access memory, etc. The memory 222 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art.

Figure 3:
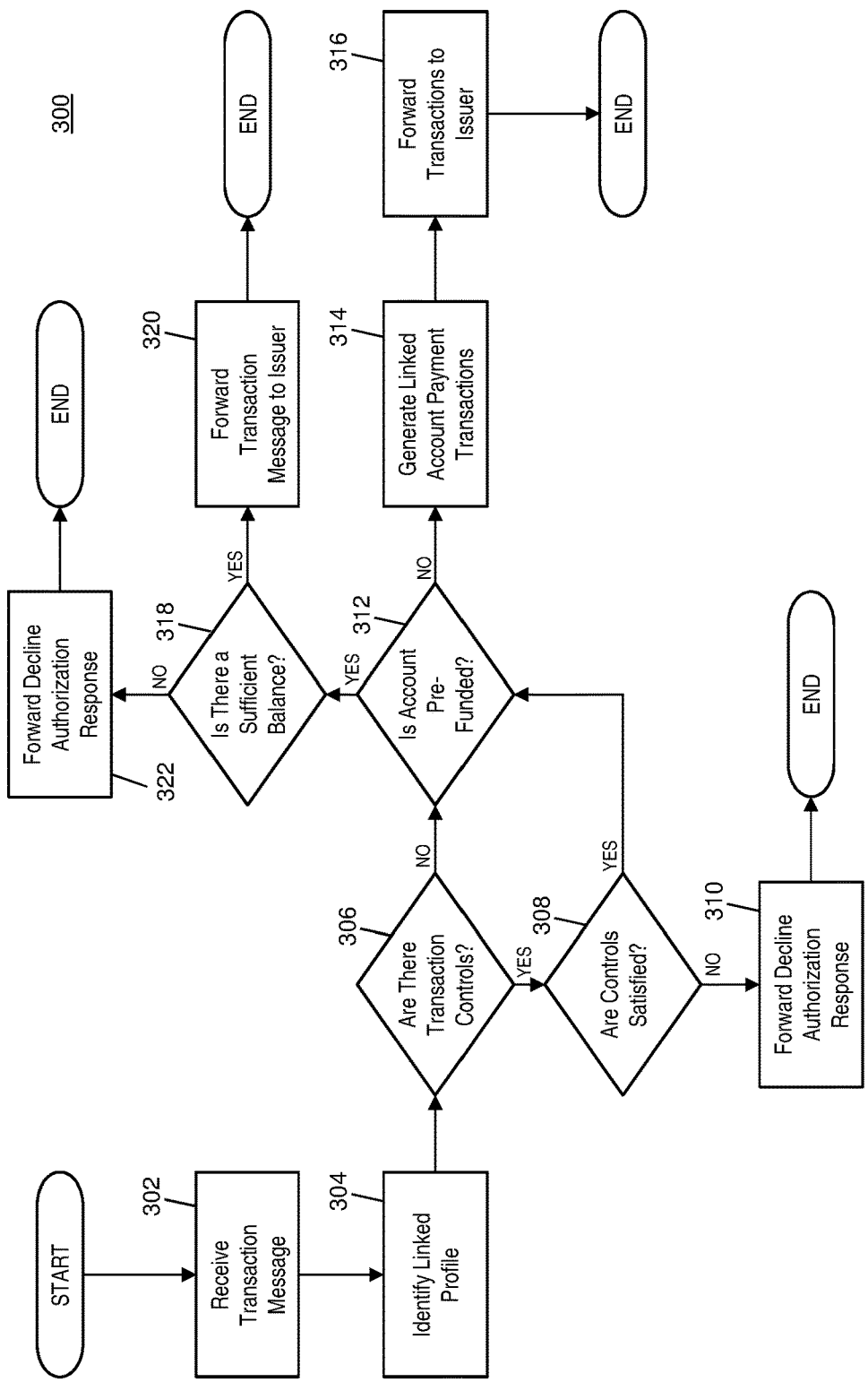
FIG. 3 is a flow diagram illustrating a process for processing a shared payment transaction involving linked electronic wallets using the processing server of FIG. 2 in accordance with exemplary embodiments.

Process for Processing Shared Payment Transactions Using a Linked Electronic Wallet FIG. 3 illustrates a process 300 for the processing of a shared payment transaction utilizing a linked electronic wallet that is funded by a plurality of transaction accounts via the linked electronic wallet.

In step 302, the receiving device 202 of the processing server 102 may receive a transaction message for a payment transaction. The transaction message may be received from a payment network 110 or directly from a third party entity associated with a merchant 108 (e.g., an acquirer, gateway process, etc.) via the payment rails. The transaction message may include a message type indicator indicative of an authorization request and may also plurality of data elements, including a data element configured to store a primary account number and one or more additional data elements configured to store additional transaction data.

In step 304, the querying module 214 of the processing server 102 may execute a query on the linked database 210 to identify a linked profile 212 associated with the transaction message. The linked profile 212 may be identified based on the inclusion of the primary account number stored in the corresponding data element included in the received transaction message. In step 306, the transaction processing module 218 of the processing server 102 may begin processing of the transaction by determining if the payment transaction is subject to transaction controls. The determination may be based on criteria set forth in the identified linked profile 212. For instance, if the linked profile 212 does or does not include any transaction controls.

If the payment transaction is subject to transaction controls due to controls in the linked profile 210, then, in step 308, the transaction processing module 218 may determine if the transaction controls are satisfied. The determination may be based on a comparison of the transaction controls included in the identified linked profile 212 to the transaction data stored in the one or more additional data elements included in the received transaction message. If the transaction controls are not satisfied, such that the transaction controls indicate denial of the payment transaction based on the transaction data, then in step 310, the transmitting device 220 of the processing server may electronically transmit an authorization response to the payment network 110 indicating denial of the payment transaction. The authorization response may be generated by the transaction processing module 218, and may, in some instances, be a modification of the received authorization request.

If, in step 308, the transaction processing module 218 determines that the transaction controls are satisfied, or if, in step 306, the transaction processing module 218 determines that the payment transaction is not subject to any transaction controls, then, in step 312, the transaction processing module 218 may determine if the linked transaction account is a pre-funded account. The determination may be made based on data included in the identified linked profile 212 or associated therewith, which may indicate if the linked transaction account must have a sufficient balance to cover a payment transaction for approval and processing thereof.

If the linked transaction account is not a pre-funded transaction account, then, in step 314, the transaction processing module 218 may generate transaction messages for funding payment transactions linked to the linked transaction account. The transaction messages may include message type indicators indicative of authorization requests, and may include transaction amounts and transaction account numbers for funding transaction accounts that are based on funding rules included in the identified linked profile 212. In step 316, the transmitting device 220 may electronically transmit the transaction messages to the associated issuers 106 via the payment network 110, or may directly transmit the transaction messages to the payment network 110 for processing thereof (e.g., including forwarding to the respective issuers 106). In instances where the processing server 102 may operate as the issuing financial institution for the linked account, the receiving device 202 of the processing server 102 may receive the transaction messages from the associated issuers 106 and the transaction processing module 218 of the processing server 102 may determine approval of the payment transaction based thereon. For example, the transaction processing module 218 may determine approval if each of the funding payment transactions are approved, and may determine denial if one or more of the funding payment transactions are declined. The transaction processing module 218 may generate a transaction message accordingly, which may be an authorization response and may include a response code indicating if the primary payment transactions is declined or approved. The transmitting device 220 may then electronically transmit the authorization response to the payment network 110 for further processing (e.g., forwarding to the merchant 108).

If, in step 312, the transaction processing module 218 determines that the linked transaction account is a pre-funded account, then, in step 318, the transaction processing module 218 may determine if the linked transaction account has a sufficient balance to cover the transaction amount for the payment transaction. The account balance may be included in the linked profile 212, and may be compared to the transaction amount as stored in a corresponding data element included in the received transaction message. If the account balance is sufficient, then, in step 320, the transmitting device 220 may electronically transmit the transaction message to the issuer 106 associated with the linked transaction account, if applicable. In instances where the processing server 102 may operate as the issuing financial institution for the linked transaction account, step 320 may include the forwarding of an authorization response indicating approval of the payment transaction to the payment network 110 for processing, subject to other considerations for approval/denial of the payment transaction (e.g., fraud). If, in step 318, it is determined that the linked transaction account does not have sufficient balance, then, in step 322, the transmitting device 220 may electronically transmit an authorization response to the payment network 110 indicating that the payment transaction is declined.

Processing a Split Payment Transaction

Figure 4:
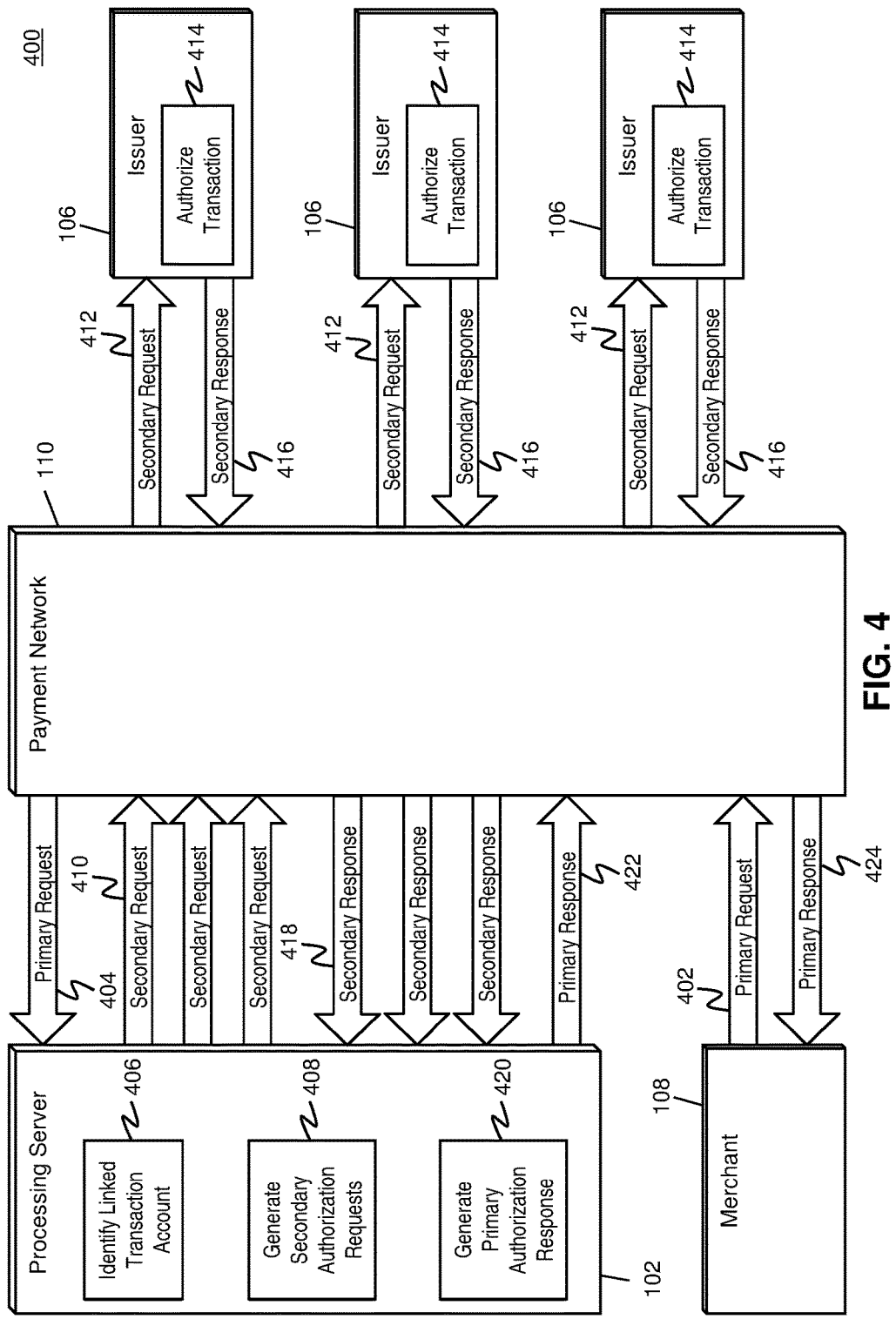
FIG. 4 is a flow diagram illustrating a process for multiple cascading authorizations for a split payment transaction using the system of FIG. 1 in accordance with exemplary embodiments.

FIG. 4 illustrates a process 400 for the processing of a split payment transaction funded by multiple funding accounts using a multiple cascading authorization.

In step 402, a merchant 108 may submit transaction data for a primary payment transaction to be funded by multiple funding transaction accounts to a payment network 110. The payment network 110 may receive the transaction data in a transaction message formatted pursuant to one or more standards, such as the ISO 8583 standard, which may be generated by the merchant 108 or one or more intermediate entities, such as an acquiring financial institution. The transaction message may include a message type indicator indicative of an authorization request and may include a plurality of data elements including a first data element configured to store a primary account number for a linked transaction account and a second data element configured to store a primary transaction amount.

In step 404, the payment network 110 may electronically transmit the authorization request for the primary payment transaction to the processing server 102. The processing server 102 may be identified for forwarding of the authorization request based on the primary account number and/or information included therein (e.g., a bank identification number). The receiving device 202 of the processing server 102 may receive the authorization request. In step 406, the querying module 214 of the processing server 102 may execute a query on the linked database 210 to identify a linked profile 212 related to the linked transaction account involved in the primary payment transaction, by identifying the linked profile 212 that includes the primary account number stored in the corresponding data element included in the authorization request.

In step 408, the transaction processing module 224 of the processing server 102 may generate a plurality of secondary authorization requests. Each secondary authorization request may be a transaction message for a secondary payment transaction related to the primary payment transaction, for the funding of a partial amount of the full transaction amount by a funding transaction account. Each secondary authorization request may include a message type indicator indicative of an authorization request, a data element configured to store a funding account number associated with the respective funding transaction account, and a data element configured to store a secondary transaction amount. The funding account number may be one of a plurality of funding account number stored in the linked profile 212. The secondary transaction amount may be associated with the respective funding account number and may be calculated by the transaction processing module 218. In some instances, each secondary authorization request may include the same secondary transaction amount. In other instances, the secondary transaction amount may be different for one or more funding transaction accounts, such as based on funding rules associated with the linked transaction account.

In step 410, the transmitting device 220 of the processing server 102 may electronically transmit each secondary authorization request to the payment network 110 via the payment rails. In step 412, the payment network 110 may electronically transmit each secondary authorization request to an associated issuer 106 via the payment rails. Each issuer 106 may receive a secondary authorization request for any funding transaction account managed or by or otherwise associated with the issuer 106. In the example illustrated in FIG. 4, there are three different funding transaction accounts used to fund the split payment transaction, with each having a different issuer 106 receiving their respective secondary authorization request. In step 414, each issuer 106 may perform authorization for the respective secondary payment transaction, which may result in an approval or denial of the secondary payment transaction. Methods and processes for authorizing a payment transaction at an issuer 106 will be apparent to persons having skill in the relevant art.

The authorization may result in the generation of an authorization response for each secondary payment transaction. The secondary authorization response may be a transaction message that includes a message type indicator indicative of an authorization response that includes a plurality of data elements including the data element configured to store the respective funding account number, the data element configured to store the associated secondary transaction amount, and a data element configured to store a response code that indicates if the secondary payment transaction was approved or denied. In step 416, the secondary authorization responses may be electronically transmitted to the payment network 110 via the payment rails. In step 418, the payment network may forward the secondary authorization responses to the processing server 102 via the payment rails.

In step 420, the transaction processing module 218 of the processing server 102 may generate an authorization response for the primary payment transaction based on the received secondary authorization responses. The authorization response for the primary payment transaction may be a transaction message that includes a message type indicator indicative of an authorization response and a plurality of data elements, including a data element configured to store the primary account number for the linked transaction account, the data element configured to store the transaction amount, and a data element configured to store a response code. The response code may indicate approval if each of the secondary payment transactions were approved, as may be indicated by a response code included in the corresponding data element included in each of the secondary authorization responses that indicates approval. The response code may indicate denial if at least one of the secondary payment transactions were denied.

In step 422, the transmitting device 220 of the processing server 102 may electronically transmit the primary authorization response to the payment network 110 via the payment rails. In step 424, the payment network 110 may forward the primary authorization response to the merchant 108 via the payment rails. The merchant 108 may then finalize the split payment transaction accordingly. In some embodiments, the processing server 102 may also be configured to initiate one or more authorization reversals in instances where the result of the multiple cascading authorization is that the split payment transaction is denied. In such embodiments, the transaction processing module 218 may generate a transaction message for an authorization request reversal for any secondary payment transaction that was approved (e.g., as indicated by the associated response code), such that the related funding transaction account is not debited or such that such a debiting is reversed due to the denial of the primary payment transaction.

Controlled Payment Numbers for Linked Electronic Wallets

Figure 5:
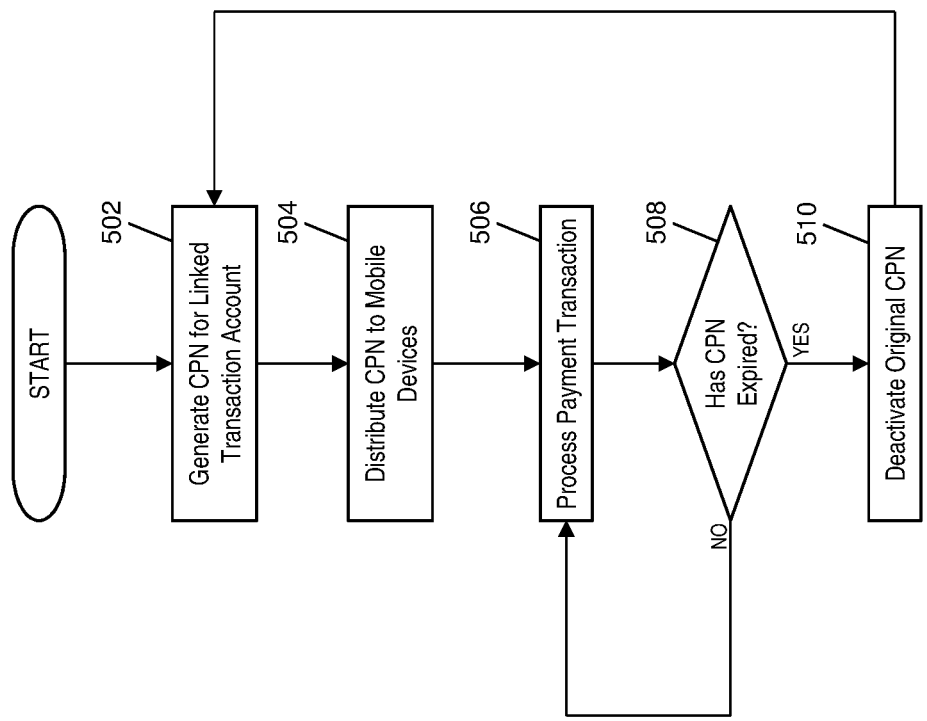
FIG. 5 is a flow diagram illustrating a process for the use of an expiring controlled payment number funded by multiple transaction accounts in accordance with exemplary embodiments.

FIG. 5 illustrates a process 500 for the generation and use of a controlled payment number (CPN) for use in a linked transaction account, where the controlled payment number is associated with one or more criteria for the expiration thereof.

In step 502, the generation module 224 of the processing server 102 may generate a controlled payment number for a linked transaction account. The controlled payment number may be subject to one or more transaction controls set for the linked transaction account where payment transactions involving the linked transaction account (e.g., where the controlled payment number is included as the primary account number in a corresponding transaction message) must be in compliance with the transaction controls to be approved. In some embodiments, the transaction controls may be set by individuals associated with the funding transaction accounts, such as via their associated mobile devices 104. For example, one or more mobile devices 104 may provide authorization for a future payment transaction up to a specific transaction amount (e.g., a total transaction amount or a funding amount for their associated funding transaction account). In such an instance, the controlled payment number may include a transaction control that is set based on the authorizations provided by the individuals. For example, four individuals may agree to a total spending limit of $100 for a gift to be purchased for a friend's birthday, with a transaction control being set for a transaction amount limit of $100.

The controlled payment number may also be subject to one or more expiration criteria. Expiration criteria may be criteria such that, when met, the controlled payment number expires and is no longer usable (e.g., is inactive). In some instances, the expiration criteria may be associated with a transaction control. For instance, in the above example, the controlled payment number may be set to expire once the transaction amount limit of $100 is met, so as to not overspend for the friend's birthday. The controlled payment number and associated transaction controls and expiration criteria may be stored (e.g., via the querying module 214) in the linked profile 212 related to the corresponding linked transaction account.

In step 504, the transmitting device 220 of the processing server 102 may electronically transmit data signals superimposed with the controlled payment number and any other associated payment credentials to mobile devices 104 associated with the linked transaction account. The mobile devices 104 may receive the controlled payment number and may use the controlled payment number in future payment transactions, subject to the associated transaction controls, to be funded using the linked transaction account. In step 506, the processing server 102 may process one or more payment transactions funded by the linked transaction account using the methods and systems discussed herein, such as using the processes 300 and 400 illustrated in FIGS. 3 and 4, respectively, and discussed above. The payment transactions may be funded by the linked transaction account using the controlled payment number distributed to the mobile devices 104.

In step 508, the transaction processing module 218 or other suitable module or engine of the processing server 102 may determine if the controlled payment number for the linked transaction account has expired. The determination may be based on the expiration criteria associated with the controlled payment number and any other corresponding data. For example, if the expiration criteria includes an expiration date, then the controlled payment number may be expired if the expiration date has been met or passed. In another example, if the expiration criteria includes an aggregate transaction amount, then the controlled payment number may be expired if the aggregate transaction amount has been met or exceed by the payment transactions for that linked transaction account. In yet another example, if the expiration criteria includes a number of transactions, then the controlled payment number may be expired once that number of transactions have been processed. In some instances, multiple expiration criteria may be set for a controlled payment number. In such an instance, the controlled payment number may be expired if at least one expiration criteria is met, or if all expiration criteria are met, which may be dependent on preferences of the users of the linked transaction account, the processing server 102, issuers 106, etc.

If the transaction processing module 218 determines that the controlled payment number has not expired, then the process 500 may return to step 506 where payment transactions involving the linked transaction account may continue to be processed. If the transaction processing module 218 determines that the controlled payment number is expired, then, in step 510, the transaction processing module 218 may deactivate the controlled payment number. Deactivation of the controlled payment number may include removal (e.g., via the querying module 214) of the controlled payment number from the linked profile 212, modification to one or more databases included in the processing server 102 associated with the use of controlled payment numbers, or other suitable method for deactivating a controlled payment number. Then the process 500 may return to step 502 where a new controlled payment number may be generated for the linked transaction account to be used in place of the now-expired controlled payment number.

Exemplary Method for Distributing Credentials to a Linked Electronic Wallet

Figure 6:
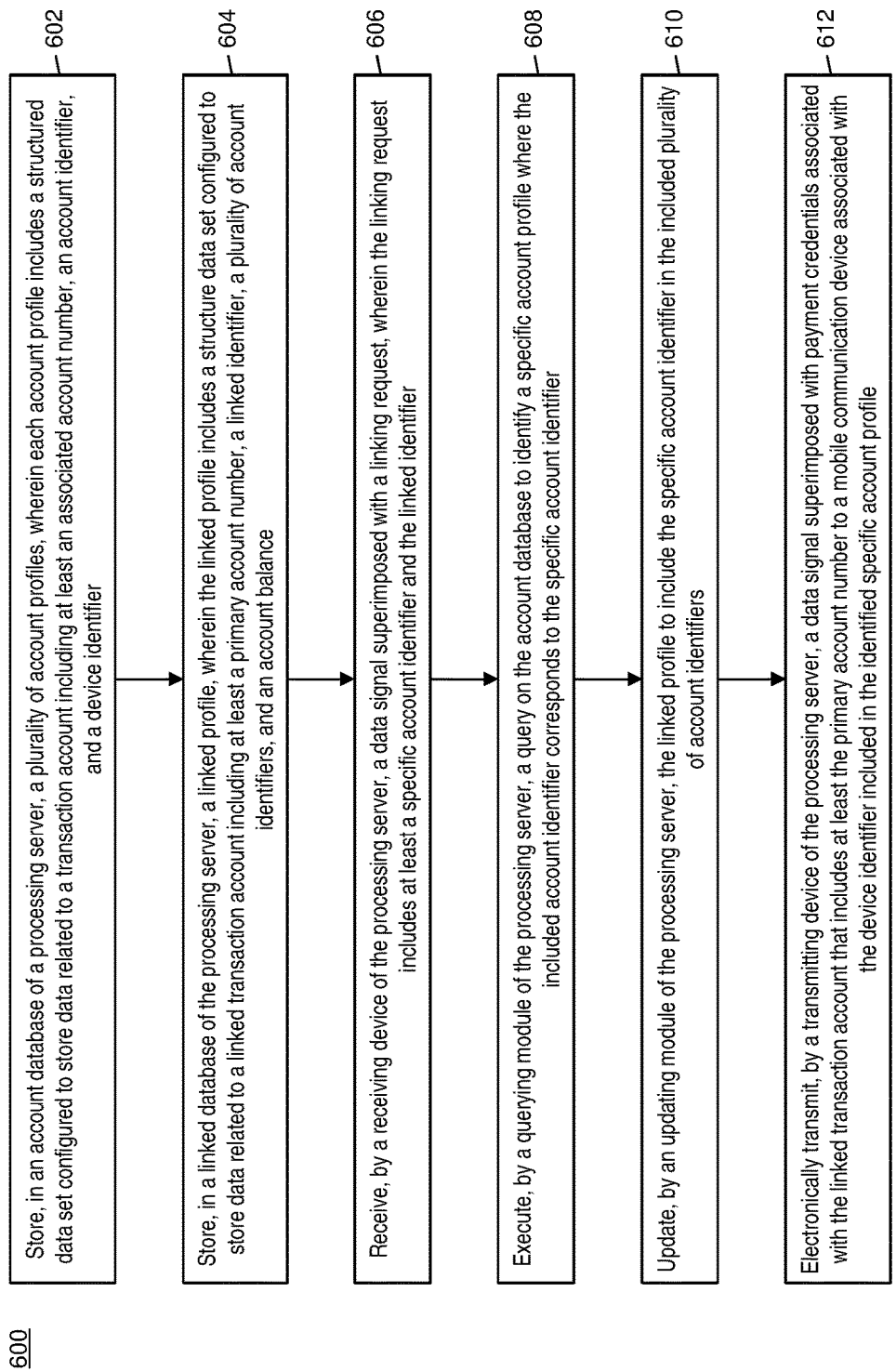
FIG. 6 is a flow chart illustrating an exemplary method for distributing credentials to a linked electronic wallet in accordance with exemplary embodiments.

FIG. 6 illustrates a method 600 for the distribution of payment credentials to a linked electronic wallet for use in conjunction with a linked transaction account for shared payment transactions funded by a plurality of transaction accounts.

In step 602, a plurality of account profiles (e.g., account profiles 208) may be stored in an account database (e.g., the account database 206) of a processing server (e.g., the processing server 102), wherein each account profile includes a structured data set configured to store data related to a transaction account including at least an associated account number, an account identifier, and a device identifier. In step 604, a linked profile (e.g., linked profile 212) may be stored in a linked database (e.g., the linked database 210) of the processing server, wherein the linked profile includes a structure data set configured to store data related to a linked transaction account including at least a primary account number, a linked identifier, a plurality of account identifiers, and an account balance.

In step 606, a data signal superimposed with a linking request may be received by a receiving device (e.g., the receiving device 202) of the processing server, wherein the linking request includes at least a specific account identifier and the linked identifier. In step 608, a query may be executed on the account database by a querying module (e.g., the querying module 214) of the processing server to identify a specific account profile where the included account identifier corresponds to the specific account identifier.

In step 610, the linked profile may be updated by an updating module (e.g., the updating module 216) of the processing server to include the specific account identifier included in the plurality of account identifiers. In step 612, a data signal superimposed with payment credentials associated with the linked transaction account that includes at least the primary account number may be electronically transmitted by a transmitting device (e.g., the transmitting device 220) of the processing server to a mobile communication device (e.g., mobile device 104) associated with the device identifier included in the identified specific account profile.

In one embodiment, payment transactions involving the primary account number may be funded by transaction accounts associated with each account identifier of the plurality of account identifiers included in the updated linked profile. In a further embodiment, the account balance included in the linked profile may correspond to funds deposited in the linked transaction account by the transaction accounts associated with each account identifier of the plurality of account identifiers. In another further embodiment, the account balance included in the linked profile may correspond to an available account balance for each transaction account associated with each account identifier of the plurality of account identifiers.

In yet another further embodiment, the method 600 may further include: receiving, by the receiving device of the processing server, a transaction message via a payment network (e.g., the payment network 110), wherein the transaction message is formatted based on one or more standards and includes a plurality of data elements including at least a first data element configured to store the primary account number, a second data element configured to store a transaction amount, and a third data element configured to store a merchant identifier; and processing, by a transaction processing module of the processing server, one or more fund transfers for payment of the transaction amount from each transaction account associated with each account identifier of the plurality of account identifiers to a financial institution associated with a merchant (e.g., merchant 108) corresponding to the merchant identifier. In an even further embodiment, an amount for each of the one or more fund transfers may be based on one or more funding rules stored in the linked profile.

In some embodiments, the linked profile may further include one or more account controls where payment transactions involving the linked transaction account are subject to the one or more account controls. In a further embodiment, the one or more account controls may include a control on at least one of: transaction amount, transaction time, transaction date, merchant identifier, merchant category code, transaction frequency, aggregate transaction amount, and geographic location.

In another further embodiment, the method 600 may also include: receiving, by the receiving device of the processing server, a transaction message via a payment network, wherein the transaction message is formatted based on one or more standards and includes a plurality of data elements including at least a first data element configured to store the primary account number, a second data element configured to store a transaction amount, and one or more additional data elements configured to store transaction data; and determining, by a transaction processing module of the processing server, compliance of the payment transaction to the one or more account controls included in the linked profile based on at least a comparison of the transaction data stored in the one or more additional data elements included in the received transaction message and the one or more account controls. In an even further embodiment, the transaction data may include at least one of: transaction amount, transaction time, transaction date, geographic location, merchant data, consumer data, issuer data, acquirer data, product data, offer data, reward data, and loyalty data.

Exemplary Method for Processing Transaction Data

Figure 7:
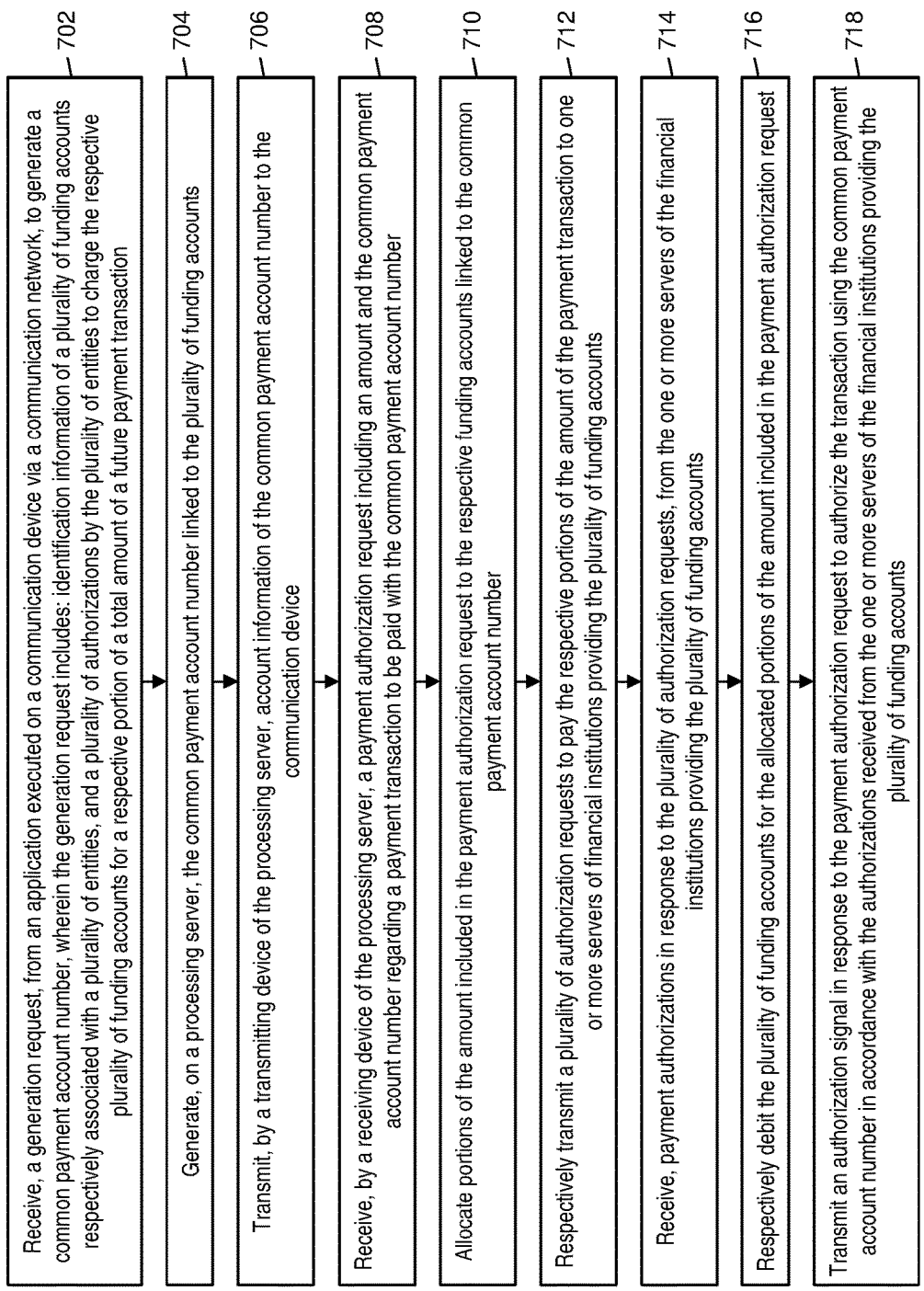
FIG. 7 is a flow chart illustrating an exemplary method for processing transaction data in accordance with exemplary embodiments.

FIG. 7 illustrates a method 700 for processing transaction data for a linked transaction account that is funded using a plurality of funding accounts, where the payment transaction using the linked transaction account is authorized based on authorization of transactions involving the plurality of funding accounts.

In step 702, a generation request may be received (e.g., via the receiving device 202 of the processing server 102) from an application executed on a communication device (e.g., a mobile device 104) via a communication network, wherein the generation request is a request to generate a common payment account number, the generation request including: identification information of a plurality of funding accounts respectively associated with a plurality of entities, and a plurality of authorizations by the plurality of entities to charge the respective plurality of funding accounts for a respective portion of a total amount of a future payment transaction. In step 704, the common payment account number linked to the plurality of funding accounts may be generated (e.g., by a generation module 224) on a processing server (e.g., the processing server 102).

In step 706, account information of the common payment account number may be transmitted by a transmitting device (e.g., the transmitting device 220) of the processing server to the communication device. In step 708, a payment authorization request may be received by a receiving device (e.g., the receiving device 202) of the processing server, the payment authorization request including an amount and the common payment account number regarding a payment transaction to be paid with the common payment account number.

In step 710, portions of the amount included in the payment authorization request may be allocated (e.g., by a transaction processing module 218) to the respective funding accounts linked to the common payment account number. In step 712, a plurality of authorization requests may be respectively transmitted (e.g., by the transmitting device 220) to one or more servers of financial institutions (e.g., issuers 106) providing the plurality of funding accounts, the authorization requests being requests to pay the respective potions of the amount of the payment transaction.

In step 714, payment authorizations may be received (e.g., by the receiving device 202) in response to the plurality of authorization requests from the one or more servers of the financial institutions providing the plurality of funding accounts. In step 716, the plurality of funding accounts may be respectively debited (e.g., by the transaction processing module 218) for the allocated portions of the amount included in the payment authorization request. In step 718, an authorization signal may be transmitted (e.g., by the transmitting device 220) in response to the payment authorization request to authorize the transaction using the common payment account number in accordance with the authorizations received from the one or more servers of the financial institutions providing the plurality of funding accounts.

In one embodiment, the respective portion included in each of the plurality of authorizations may be a percentage value authorized by each of the plurality of entities. In some embodiments, the respective portion included in each of the plurality of authorizations may be a currency threshold value authorized by each of the plurality of entities. In one embodiment, the method 700 may further include transmitting (e.g., by the transmitting device 220) a confirmation request to the application on the communication device to confirm that the payment transaction is initiated by at least one of the plurality of entities. In some embodiments, the generation request may include an expiration date of the request common payment account number.

In one embodiment, the generation request may include a limitation that indicates maximum times that the requested common payment account number may be used for future payments. In some embodiments, the method 700 may also include determining (e.g., by the transaction processing module 218) a credit line value for the common payment account number based at least on balance information of each of the funding accounts and credit histories of the funding accounts.

In one embodiment, the funding accounts may be at least one of one or more debit accounts or credit accounts. In some embodiments, the method 700 may further include transmitting (e.g., by the transmitting device 220) a denial signal when a payment decline signal is received from at least one of the one or more servers of the financial institutions providing the plurality of funding accounts. In one embodiment, the identification information of the plurality of funding accounts may include at least a plurality of account numbers of the respective plurality of funding accounts.

Exemplary Method for Processing a Split Payment Transaction

Figure 8:
FIG. 8 is a flow chart illustrating an exemplary method for processing a split payment transaction funded by a plurality of transaction accounts in accordance with exemplary embodiments.

FIG. 8 illustrates a method 800 for the processing of a split payment transaction using a multiple cascading authorization that is funded by a plurality of different transaction accounts.

In step 802, an account profile (e.g., linked profile 212) may be stored in an account database (e.g., linked database 210) of a processing server (e.g., the processing server 102), wherein the account profile includes a structured data set related to a linked transaction account including at least a specific primary account number, one or more funding rules, and a plurality of funding account numbers. In step 804, a transaction message for a primary payment transaction may be received by a receiving device (e.g., the receiving device 202) of the processing server, wherein the transaction message is formatted based on one or more standards and includes at least a plurality of data elements including at least a first data element configured to store the specific primary account number and a second data element configured to store a primary transaction amount.

In step 806, a secondary transaction amount may be calculated for each funding account number of the plurality of funding account numbers by a transaction processing module (e.g., the transaction processing module 218) of the processing server based on at least the primary transaction amount stored in the second data element included in the received transaction message and the one or more funding rules included in the stored account profile. In step 808, a transaction message may be generated for a secondary payment transaction for each funding account number of the plurality of funding account numbers by the transaction processing module of the processing server, wherein each transaction message is formatted based on the one or more standards and includes at least a plurality of data elements including at least a first data element configured to store the respective funding account number and a second data element configured to store the respective associated secondary transaction amount.

In step 810, the transaction message for the secondary payment transaction may be electronically transmitted by a transmitting device (e.g., the transmitting device 220) of the processing server for each funding account number of the plurality of funding account numbers. In step 812, a response message may be received by the receiving device of the processing server for the secondary payment transaction for each funding account number of the plurality of funding account numbers, wherein each response message is formatted based on the one or more standards and includes at least a plurality of data elements including at least a third data element configured to store a response code indicating approval or denial of the secondary payment transaction.

In step 814, a response message may be generated by the transaction processing module 218 of the processing server for the primary payment transaction, wherein the response message is formatted based on the one or more standards and includes at least a plurality of data elements including at least a third data element configured to store a response code, where the response code (i) indicates approval of the primary payment transaction if the response code stored in the third data element included in each of the received response messages for the secondary payment transactions indicates approval, or (ii) indicates denial of the primary payment transaction if the response code stored in the third data element included in at least one of the received response messages for the secondary payment transactions indicates denial. In step 816, the generated response message for the primary payment transaction may be electronically transmitted by the transmitting device of the processing server in response to the received transaction message for the primary payment transaction.

In one embodiment, the method 800 may further include: storing, in the account database of the processing server, a plurality of additional account profiles, wherein each additional account profiles includes a structured data set related to a different linked transaction account including at least a different primary account number, one or more funding rules, and a different plurality of funding account numbers; and executing, by a querying module (e.g., the querying module 214) of the processing server, a query on the account database to identify the account profile where the included specific primary account number corresponds to the specific primary account number stored in the first data element included in the received transaction message for the primary payment transaction. In some embodiments, the received transaction message for the primary payment transaction may be received from a payment network (e.g., the payment network 110), and the generated response message for the primary payment transaction may be electronically transmitted to the payment network. In one embodiment, each generated transaction message for the secondary payment transactions may be electronically transmitted to a payment network (e.g., the payment network 110), and each received response message for the secondary payment transactions may be received from the payment network.

In one embodiment, the received transaction message for the primary payment transaction may further include a message type indicator indicative of an authorization request. In some embodiments, each generated transaction message for the secondary payment transactions may further include a message type indicator indicative of an authorization request. In one embodiment, the generated response message for the primary payment transaction may further include a message type indicator indicative of an authorization response. In some embodiments, each received response message for the secondary payment transactions may further include a message type indicator indicative of an authorization response.

In one embodiment, the method 800 may also include: generating, for each received response message where the response code stored in the third data element included therein indicates denial of the respective secondary payment transaction, a reversal message, wherein the reversal message is formatted based on the one or more standards and includes a plurality of data elements including at least the first data element configured to store the respective funding account number, a second data element configured to store the associated secondary transaction amount, and a third data element configured to store matching data; and electronically transmitting, by the transmitting device of the processing server, each generated reversal message. In a further embodiment, each generated reversal message may further include a message type indicator indicative of an authorization reversal request.

Payment Transaction Processing System and Process

Figure 9:
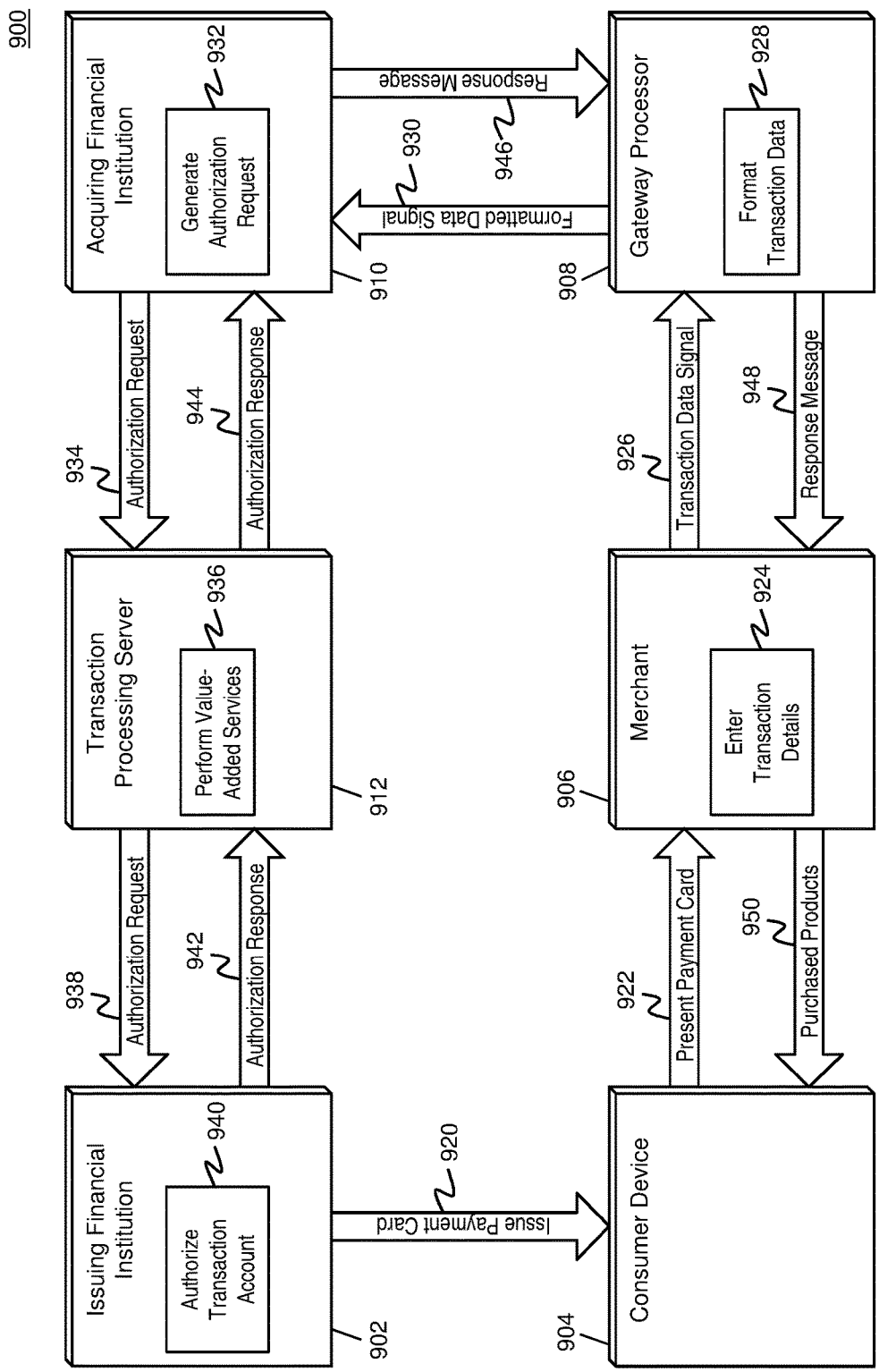
FIG. 9 is a flow diagram illustrating the processing of a payment transaction in accordance with exemplary embodiments.

FIG. 9 illustrates a transaction processing system and a process 900 for the processing of payment transactions in the system. The process 900 and steps included therein may be performed by one or more components of the system 100 discussed above, such as the processing server 102, mobile devices 104, issuers 106, merchants 108, payment network 110, etc. The processing of payment transactions using the system and process 900 illustrated in FIG. 9 and discussed below may utilize the payment rails, which may be comprised of the computing devices and infrastructure utilized to perform the steps of the process 900 as specially configured and programmed by the entities discussed below, including the transaction processing server 912, which may be associated with one or more payment networks configured to processing payment transactions. It will be apparent to persons having skill in the relevant art that the process 900 may be incorporated into the processes illustrated in FIGS. 3-8, discussed above, with respect to the step or steps involved in the processing of a payment transaction. In addition, the entities discussed herein for performing the process 900 may include one or more computing devices or systems configured to perform the functions discussed below. For instance, the merchant 906 may be comprised of one or more point of sale devices, a local communication network, a computing server, and other devices configured to perform the functions discussed below.

In step 920, an issuing financial institution 902 may issue a payment card or other suitable payment instrument to a consumer 904. The issuing financial institution may be a financial institution, such as a bank, or other suitable type of entity that administers and manages payment accounts and/or payment instruments for use with payment accounts that can be used to fund payment transactions. The consumer 904 may have a transaction account with the issuing financial institution 902 for which the issued payment card is associated, such that, when used in a payment transaction, the payment transaction is funded by the associated transaction account. In some embodiments, the payment card may be issued to the consumer 904 physically. In other embodiments, the payment card may be a virtual payment card or otherwise provisioned to the consumer 904 in an electronic format.

In step 922, the consumer 904 may present the issued payment card to a merchant 906 for use in funding a payment transaction. The merchant 906 may be a business, another consumer, or any entity that may engage in a payment transaction with the consumer 904. The payment card may be presented by the consumer 904 via providing the physical card to the merchant 906, electronically transmitting (e.g., via near field communication, wireless transmission, or other suitable electronic transmission type and protocol) payment details for the payment card, or initiating transmission of payment details to the merchant 906 via a third party. The merchant 906 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 924, the merchant 906 may enter transaction details into a point of sale computing system. The transaction details may include the payment details provided by the consumer 904 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 906 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 906 may be an online retailer in an e-commerce transaction. In such embodiments, the transaction details may be entered in a shopping cart or other repository for storing transaction data in an electronic transaction as will be apparent to persons having skill in the relevant art.

In step 926, the merchant 906 may electronically transmit a data signal superimposed with transaction data to a gateway processor 908. The gateway processor 908 may be an entity configured to receive transaction details from a merchant 906 for formatting and transmission to an acquiring financial institution 910. In some instances, a gateway processor 908 may be associated with a plurality of merchants 906 and a plurality of acquiring financial institutions 910. In such instances, the gateway processor 908 may receive transaction details for a plurality of different transactions involving various merchants, which may be forwarded on to appropriate acquiring financial institutions 910. By having relationships with multiple acquiring financial institutions 910 and having the requisite infrastructure to communicate with financial institutions using the payment rails, such as using application programming interfaces associated with the gateway processor 908 or financial institutions used for the submission, receipt, and retrieval of data, a gateway processor 908 may act as an intermediary for a merchant 906 to be able to conduct payment transactions via a single communication channel and format with the gateway processor 908, without having to maintain relationships with multiple acquiring financial institutions 910 and payment processors and the hardware associated thereto. Acquiring financial institutions 910 may be financial institutions, such as banks, or other entities that administers and manages payment accounts and/or payment instruments for use with payment accounts. In some instances, acquiring financial institutions 910 may manage transaction accounts for merchants 906. In some cases, a single financial institution may operate as both an issuing financial institution 902 and an acquiring financial institution 910.

The data signal transmitted from the merchant 906 to the gateway processor 908 may be superimposed with the transaction details for the payment transaction, which may be formatted based on one or more standards. In some embodiments, the standards may be set forth by the gateway processor 908, which may use a unique, proprietary format for the transmission of transaction data to/from the gateway processor 908. In other embodiments, a public standard may be used, such as the International Organization for Standardization's ISO 8983 standard. The standard may indicate the types of data that may be included, the formatting of the data, how the data is to be stored and transmitted, and other criteria for the transmission of the transaction data to the gateway processor 908.

In step 928, the gateway processor 908 may parse the transaction data signal to obtain the transaction data superimposed thereon and may format the transaction data as necessary. The formatting of the transaction data may be performed by the gateway processor 908 based on the proprietary standards of the gateway processor 908 or an acquiring financial institution 910 associated with the payment transaction. The proprietary standards may specify the type of data included in the transaction data and the format for storage and transmission of the data. The acquiring financial institution 910 may be identified by the gateway processor 908 using the transaction data, such as by parsing the transaction data (e.g., deconstructing into data elements) to obtain an account identifier included therein associated with the acquiring financial institution 910. In some instances, the gateway processor 908 may then format the transaction data based on the identified acquiring financial institution 910, such as to comply with standards of formatting specified by the acquiring financial institution 910. In some embodiments, the identified acquiring financial institution 910 may be associated with the merchant 906 involved in the payment transaction, and, in some cases, may manage a transaction account associated with the merchant 906.

In step 930, the gateway processor 908 may electronically transmit a data signal superimposed with the formatted transaction data to the identified acquiring financial institution 910. The acquiring financial institution 910 may receive the data signal and parse the signal to obtain the formatted transaction data superimposed thereon. In step 932, the acquiring financial institution may generate an authorization request for the payment transaction based on the formatted transaction data. The authorization request may be a specially formatted transaction message that is formatted pursuant to one or more standards, such as the ISO 8983 standard and standards set forth by a payment processor used to process the payment transaction, such as a payment network. The authorization request may be a transaction message that includes a message type indicator indicative of an authorization request, which may indicate that the merchant 906 involved in the payment transaction is requesting payment or a promise of payment from the issuing financial institution 902 for the transaction. The authorization request may include a plurality of data elements, each data element being configured to store data as set forth in the associated standards, such as for storing an account number, application cryptogram, transaction amount, issuing financial institution 902 information, etc.

In step 934, the acquiring financial institution 910 may electronically transmit the authorization request to a transaction processing server 912 for processing. The transaction processing server 912 may be comprised of one or more computing devices as part of a payment network configured to process payment transactions. In some embodiments, the authorization request may be transmitted by a transaction processor at the acquiring financial institution 910 or other entity associated with the acquiring financial institution. The transaction processor may be one or more computing devices that include a plurality of communication channels for communication with the transaction processing server 912 for the transmission of transaction messages and other data to and from the transaction processing server 912. In some embodiments, the payment network associated with the transaction processing server 912 may own or operate each transaction processor such that the payment network may maintain control over the communication of transaction messages to and from the transaction processing server 912 for network and informational security.

In step 936, the transaction processing server 912 may perform value-added services for the payment transaction. Value-added services may be services specified by the issuing financial institution 902 that may provide additional value to the issuing financial institution 902 or the consumer 904 in the processing of payment transactions. Value-added services may include, for example, fraud scoring, transaction or account controls, account number mapping, offer redemption, loyalty processing, etc. For instance, when the transaction processing server 912 receives the transaction, a fraud score for the transaction may be calculated based on the data included therein and one or more fraud scoring algorithms and/or engines. In some instances, the transaction processing server 912 may first identify the issuing financial institution 902 associated with the transaction, and then identify any services indicated by the issuing financial institution 902 to be performed. The issuing financial institution 902 may be identified, for example, by data included in a specific data element included in the authorization request, such as an issuer identification number. In another example, the issuing financial institution 902 may be identified by the primary account number stored in the authorization request, such as by using a portion of the primary account number (e.g., a bank identification number) for identification.

In step 938, the transaction processing server 912 may electronically transmit the authorization request to the issuing financial institution 902. In some instances, the authorization request may be modified, or additional data included in or transmitted accompanying the authorization request as a result of the performance of value-added services by the transaction processing server 912. In some embodiments, the authorization request may be transmitted to a transaction processor (e.g., owned or operated by the transaction processing server 912) situated at the issuing financial institution 902 or an entity associated thereof, which may forward the authorization request to the issuing financial institution 902.

In step 940, the issuing financial institution 902 may authorize the transaction account for payment of the payment transaction. The authorization may be based on an available credit amount for the transaction account and the transaction amount for the payment transaction, fraud scores provided by the transaction processing server 912, and other considerations that will be apparent to persons having skill in the relevant art. The issuing financial institution 902 may modify the authorization request to include a response code indicating approval (e.g., or denial if the transaction is to be denied) of the payment transaction. The issuing financial institution 902 may also modify a message type indicator for the transaction message to indicate that the transaction message is changed to be an authorization response. In step 942, the issuing financial institution 902 may transmit (e.g., via a transaction processor) the authorization response to the transaction processing server 912.

In step 944, the transaction processing server 912 may forward the authorization response to the acquiring financial institution 910 (e.g., via a transaction processor). In step 946, the acquiring financial institution may generate a response message indicating approval or denial of the payment transaction as indicated in the response code of the authorization response, and may transmit the response message to the gateway processor 908 using the standards and protocols set forth by the gateway processor 908. In step 948, the gateway processor 908 may forward the response message to the merchant 906 using the appropriate standards and protocols. In step 990, the merchant 906 may then provide the products purchased by the consumer 904 as part of the payment transaction to the consumer 904.

In some embodiments, once the process 900 has completed, payment from the issuing financial institution 902 to the acquiring financial institution 910 may be performed. In some instances, the payment may be made immediately or within one business day. In other instances, the payment may be made after a period of time, and in response to the submission of a clearing request from the acquiring financial institution 910 to the issuing financial institution 902 via the transaction processing server 902. In such instances, clearing requests for multiple payment transactions may be aggregated into a single clearing request, which may be used by the transaction processing server 912 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 940), the transaction processing server 912 may be configured to perform authorization of transactions on behalf of the issuing financial institution 902. Such actions may be referred to as "stand-in processing," where the transaction processing server "stands in" as the issuing financial institution 902. In such instances, the transaction processing server 912 may utilize rules set forth by the issuing financial institution 902 to determine approval or denial of the payment transaction, and may modify the transaction message accordingly prior to forwarding to the acquiring financial institution 910 in step 944. The transaction processing server 912 may retain data associated with transactions for which the transaction processing server 912 stands in, and may transmit the retained data to the issuing financial institution 902 once communication is reestablished. The issuing financial institution 902 may then process transaction accounts accordingly to accommodate for the time of lost communication.

In another example, if the transaction processing server 912 is unavailable for submission of the authorization request by the acquiring financial institution 910, then the transaction processor at the acquiring financial institution 910 may be configured to perform the processing of the transaction processing server 912 and the issuing financial institution 902. The transaction processor may include rules and data suitable for use in making a determination of approval or denial of the payment transaction based on the data included therein. For instance, the issuing financial institution 902 and/or transaction processing server 912 may set limits on transaction type, transaction amount, etc. that may be stored in the transaction processor and used to determine approval or denial of a payment transaction based thereon. In such instances, the acquiring financial institution 910 may receive an authorization response for the payment transaction even if the transaction processing server 912 is unavailable, ensuring that transactions are processed and no downtime is experienced even in instances where communication is unavailable. In such cases, the transaction processor may store transaction details for the payment transactions, which may be transmitted to the transaction processing server 912 (e.g., and from there to the associated issuing financial institutions 902) once communication is reestablished.

In some embodiments, transaction processors may be configured to include a plurality of different communication channels, which may utilize multiple communication cards and/or devices, to communicate with the transaction processing server 912 for the sending and receiving of transaction messages. For example, a transaction processor may be comprised of multiple computing devices, each having multiple communication ports that are connected to the transaction processing server 912. In such embodiments, the transaction processor may cycle through the communication channels when transmitting transaction messages to the transaction processing server 912, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 910 may identify that an authorization request involves an issuing financial institution 902 (e.g., via the bank identification number included in the transaction message) for which no value-added services are required. The transaction processor at the acquiring financial institution 910 may then transmit the authorization request directly to the transaction processor at the issuing financial institution 902 (e.g., without the authorization request passing through the transaction processing server 912), where the issuing financial institution 902 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 912 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 908, acquiring financial institution 910, etc.) for processing using this advanced network, and to quickly and efficiently receive a response regarding the ability for a consumer 904 to fund the payment transaction.

Computer System Architecture

Figure 10:
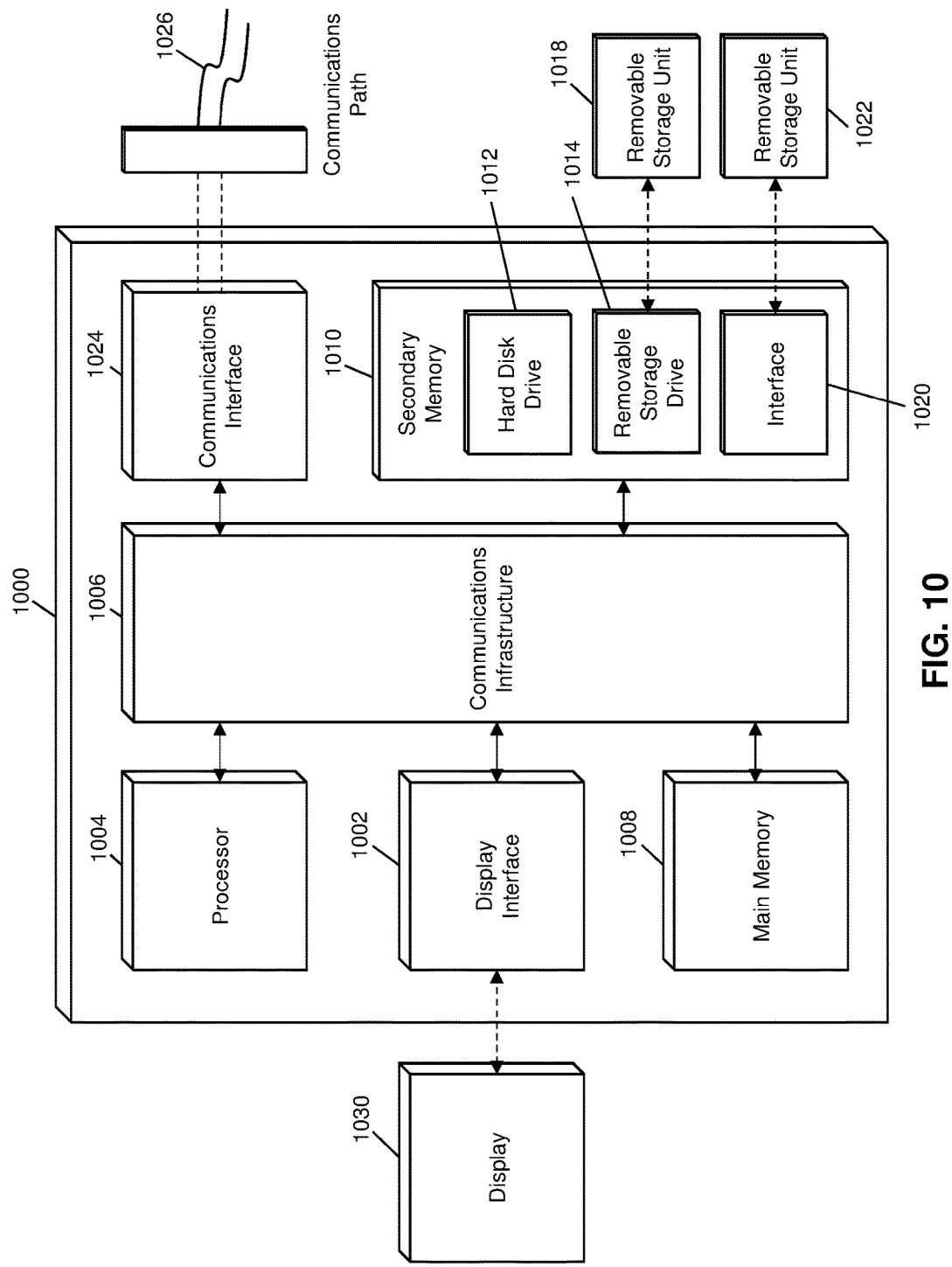
FIG. 10 is a block diagram illustrating a computer system architecture in accordance with exemplary embodiments.

FIG. 10 illustrates a computer system 1000 in which embodiments of the present disclosure, or portions thereof, may be implemented as computer-readable code. For example, the processing server 102 of FIG. 1 may be implemented in the computer system 1000 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-9.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 1018, a removable storage unit 1022, and a hard disk installed in hard disk drive 1012.

Various embodiments of the present disclosure are described in terms of this example computer system 1000. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1004 may be a special purpose or a general purpose processor device specifically configured to perform the functions discussed herein. The processor device 1004 may be connected to a communications infrastructure 1006, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 1000 may also include a main memory 1008 (e.g., random access memory, read-only memory, etc.), and may also include a secondary memory 1010. The secondary memory 1010 may include the hard disk drive 1012 and a removable storage drive 1014, such as a floppy disk drive, a magnetic tape drive, an optical disk drive, a flash memory, etc.

The removable storage drive 1014 may read from and/or write to the removable storage unit 1018 in a well-known manner. The removable storage unit 1018 may include a removable storage media that may be read by and written to by the removable storage drive 1014. For example, if the removable storage drive 1014 is a floppy disk drive or universal serial bus port, the removable storage unit 1018 may be a floppy disk or portable flash drive, respectively. In one embodiment, the removable storage unit 1018 may be non-transitory computer readable recording media.

In some embodiments, the secondary memory 1010 may include alternative means for allowing computer programs or other instructions to be loaded into the computer system 1000, for example, the removable storage unit 1022 and an interface 1020. Examples of such means may include a program cartridge and cartridge interface (e.g., as found in video game systems), a removable memory chip (e.g., EEPROM, PROM, etc.) and associated socket, and other removable storage units 1022 and interfaces 1020 as will be apparent to persons having skill in the relevant art.

Data stored in the computer system 1000 (e.g., in the main memory 1008 and/or the secondary memory 1010) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 1000 may also include a communications interface 1024. The communications interface 1024 may be configured to allow software and data to be transferred between the computer system 1000 and external devices. Exemplary communications interfaces 1024 may include a modem, a network interface (e.g., an Ethernet card), a communications port, a PCMCIA slot and card, etc. Software and data transferred via the communications interface 1024 may be in the form of signals, which may be electronic, electromagnetic, optical, or other signals as will be apparent to persons having skill in the relevant art. The signals may travel via a communications path 1026, which may be configured to carry the signals and may be implemented using wire, cable, fiber optics, a phone line, a cellular phone link, a radio frequency link, etc.

The computer system 1000 may further include a display interface 1002. The display interface 1002 may be configured to allow data to be transferred between the computer system 1000 and external display 1030. Exemplary display interfaces 1002 may include high-definition multimedia interface (HDMI), digital visual interface (DVI), video graphics array (VGA), etc. The display 1030 may be any suitable type of display for displaying data transmitted via the display interface 1002 of the computer system 1000, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 1008 and secondary memory 1010, which may be memory semiconductors (e.g., DRAMs, etc.). These computer program products may be means for providing software to the computer system 1000. Computer programs (e.g., computer control logic) may be stored in the main memory 1008 and/or the secondary memory 1010. Computer programs may also be received via the communications interface 1024. Such computer programs, when executed, may enable computer system 1000 to implement the present methods as discussed herein. In particular, the computer programs, when executed, may enable processor device 1004 to implement the methods illustrated by FIGS. 3-9, as discussed herein. Accordingly, such computer programs may represent controllers of the computer system 1000. Where the present disclosure is implemented using software, the software may be stored in a computer program product and loaded into the computer system 1000 using the removable storage drive 1014, interface 1020, and hard disk drive 1012, or communications interface 1024.

The processor device 1004 may comprise one or more modules or engines configured to perform the functions of the computer system 1000. Each of the modules or engines may be implemented using hardware and, in some instances, may also utilize software, such as corresponding to program code and/or programs stored in the main memory 1008 or secondary memory 1010. In such instances, program code may be compiled by the processor device 1004 (e.g., by a compiling module or engine) prior to execution by the hardware of the computer system 1000. For example, the program code may be source code written in a programming language that is translated into a lower level language, such as assembly language or machine code, for execution by the processor device 1004 and/or any additional hardware components of the computer system 1000. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 1000 to perform the functions disclosed herein. It will be apparent to persons having skill in the relevant art that such processes result in the computer system 1000 being a specially configured computer system 1000 uniquely programmed to perform the functions discussed above.

Techniques consistent with the present disclosure provide, among other features, systems and methods for distributing credentials to a linked electronic wallet and processing transaction data for split payment transactions funded by a plurality of transaction accounts. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for distributing credentials to a linked electronic wallet, comprising:
    storing, in an account database of a processing server, a plurality of account profiles, wherein each account profile includes a structured data set configured to store data related to a transaction account including at least an associated account number, an account identifier, and a device identifier;
    storing, in a linked database of the processing server, a linked profile, wherein the linked profile includes a structure data set configured to store data related to a linked transaction account including at least a primary account number, a linked identifier, a plurality of account identifiers, and an account balance;
    receiving, by a receiving device of the processing server, first data superimposed with a linking request, wherein the linking request includes at least a specific account identifier and the linked identifier;
    executing, by the processing server, a query on the account database to identify a specific account profile where the included account identifier corresponds to the specific account identifier;
    updating, by the processing server, the linked profile to include the specific account identifier in the included plurality of account identifiers; and
    electronically transmitting, by a transmitting device of the processing server, second data superimposed with payment credentials associated with the linked transaction account that includes at least the primary account number to a mobile communication device associated with the device identifier included in the identified specific account profile.

2. The method of claim 1, wherein payment transactions involving the primary account number are funded by transaction accounts associated with each account identifier of the plurality of account identifiers included in the updated linked profile.

3. The method of claim 2, wherein the account balance included in the linked profile corresponds to funds deposited in the linked transaction account by the transaction accounts associated with each account identifier of the plurality of account identifiers.

4. The method of claim 2, wherein the account balance included in the linked profile corresponds to an available account balance for each transaction account associated with each account identifier of the plurality of account identifiers.

5. The method of claim 2, further comprising:
    receiving, by the receiving device of the processing server, a transaction message via a payment network, wherein the transaction message is formatted based on one or more standards and includes a plurality of data elements including at least a first data element configured to store the primary account number, a second data element configured to store a transaction amount, and a third data element configured to store a merchant identifier; and
    processing, by the processing server, one or more fund transfers for payment of the transaction amount from each transaction account associated with each account identifier of the plurality of account identifiers to a financial institution associated with a merchant corresponding to the merchant identifier.

6. The method of claim 5, wherein an amount for each of the one or more fund transfers is based on one or more funding rules stored in the linked profile.

7. The method of claim 1, wherein the linked profile further includes one or more account controls where payment transactions involving the linked transaction account are subject to the one or more account controls.

8. The method of claim 7, wherein the one or more account controls include a control on at least one of: transaction amount, transaction time, transaction date, merchant identifier, merchant category code, transaction frequency, aggregate transaction amount, and geographic location.

9. The method of claim 7, further comprising:
    receiving, by the receiving device of the processing server, a transaction message via a payment network, wherein the transaction message is formatted based on one or more standards and includes a plurality of data elements including at least a first data element configured to store the primary account number, a second data element configured to store a transaction amount, and one or more additional data elements configured to store transaction data; and
    determining, by the processing server, compliance of the payment transaction to the one or more account controls included in the linked profile based on at least a comparison of the transaction data stored in the one or more additional data elements included in the received transaction message and the one or more account controls.

10. The method of claim 9, wherein the transaction data includes at least one of: transaction amount, transaction time, transaction date, geographic location, merchant data, consumer data, issuer data, acquirer data, product data, offer data, reward data, and loyalty data.

11. A system for distributing credentials to a linked electronic wallet, comprising:
    an account database of a processing server configured to store a plurality of account profiles, wherein each account profile includes a first structured data set configured to store data related to a transaction account including at least an associated account number, an account identifier, and a device identifier;
    a linked database of the processing server configured to store a linked profile, wherein the linked profile includes a second structured data set configured to store data related to a linked transaction account including at least a primary account number, a linked identifier, a plurality of account identifiers, and an account balance;
    a receiving device of the processing server configured to receive first data superimposed with a linking request, wherein the linking request includes at least a specific account identifier and the linked identifier;
    a processing device configured to:
        execute a query on the account database to identify a specific account profile where the included account identifier corresponds to the specific account identifier; and
        update the linked profile to include the specific account identifier in the included plurality of account identifiers; and
    a transmitting device of the processing server configured to electronically transmit second data superimposed with payment credentials associated with the linked transaction account that includes at least the primary account number to a mobile communication device associated with the device identifier included in the identified specific account profile.

12. The system of claim 11, wherein payment transactions involving the primary account number are funded by transaction accounts associated with each account identifier of the plurality of account identifiers included in the updated linked profile.

13. The system of claim 12, wherein the account balance included in the linked profile corresponds to funds deposited in the linked transaction account by the transaction accounts associated with each account identifier of the plurality of account identifiers.

14. The system of claim 12, wherein the account balance included in the linked profile corresponds to an available account balance for each transaction account associated with each account identifier of the plurality of account identifiers.

15. The system of claim 12,
wherein the receiving device of the processing server is further configured to receive a transaction message via a payment network, wherein the transaction message is formatted based on one or more standards and includes a plurality of data elements including at least a first data element configured to store the primary account number, a second data element configured to store a transaction amount, and a third data element configured to store a merchant identifier, and
wherein the processing device is further configured to process one or more fund transfers for payment of the transaction amount from each transaction account associated with each account identifier of the plurality of account identifiers to a financial institution associated with a merchant corresponding to the merchant identifier.

16. The system of claim 15, wherein an amount for each of the one or more fund transfers is based on one or more funding rules stored in the linked profile.

17. The system of claim 11, wherein the linked profile further includes one or more account controls where payment transactions involving the linked transaction account are subject to the one or more account controls.

18. The system of claim 17, wherein the one or more account controls include a control on at least one of: transaction amount, transaction time, transaction date, merchant identifier, merchant category code, transaction frequency, aggregate transaction amount, and geographic location.

19. The system of claim 17,
wherein the receiving device of the processing server is further configured to receive a transaction message via a payment network, wherein the transaction message is formatted based on one or more standards and includes a plurality of data elements including at least a first data element configured to store the primary account number, a second data element configured to store a transaction amount, and one or more additional data elements configured to store transaction data, and
wherein the processing device is further configured to determine compliance of the payment transaction to the one or more account controls included in the linked profile based on at least a comparison of the transaction data stored in the one or more additional data elements included in the received transaction message and the one or more account controls.

20. The system of claim 19, wherein the transaction data includes at least one of: transaction amount, transaction time, transaction date, geographic location, merchant data, consumer data, issuer data, acquirer data, product data, offer data, reward data, and loyalty data.

* * * * *